(12) United States Patent
Reich et al.

(10) Patent No.: US 11,047,874 B1
(45) Date of Patent: Jun. 29, 2021

(54) SYSTEM, APPARATUS AND METHOD FOR PREDICTING AERODYNAMIC PARAMETERS USING ARTIFICAL HAIR SENSOR ARRAY

(71) Applicant: Government of the United States, as represented by the Secretary of the Air Force, Wright-Patterson AFB, OH (US)

(72) Inventors: Gregory W. Reich, Bellbrook, OH (US); Kaman Thapa Magar, Beavercreek, OH (US); Keith Slinker, Beavercreek, OH (US); Corey R. Kondash, Beavercreek, OH (US); Benjamin T. Dickinson, Destin, FL (US); Jeffrey W. Baur, Liberty Township, OH (US); Alexander M. Pankonien, Fairborn, OH (US)

(73) Assignee: Government of the United States as represented by the Secretary of the Air Force, Wright-Patterson AFB, OH (US)

( * ) Notice: Subject to any disclaimer, the term of this patent is extended or adjusted under 35 U.S.C. 154(b) by 313 days.

(21) Appl. No.: 16/162,780

(22) Filed: Oct. 17, 2018

Related U.S. Application Data

(60) Provisional application No. 62/573,776, filed on Oct. 18, 2017.

(51) Int. Cl.
*G01P 5/26* (2006.01)
*B82Y 30/00* (2011.01)
(Continued)

(52) U.S. Cl.
CPC .............. *G01P 5/26* (2013.01); *B82Y 10/00* (2013.01); *B82Y 30/00* (2013.01); *G06F 16/9038* (2019.01); *G06N 3/02* (2013.01)

(58) Field of Classification Search
CPC ... G01N 11/16; G01F 1/28; G01F 1/00; G01P 5/26; G06N 3/02; B82Y 30/00; B82Y 10/00; G06F 16/9038
See application file for complete search history.

(56) References Cited

U.S. PATENT DOCUMENTS

| 8,983,243 B2 * | 3/2015 | Philipsen | G01M 5/0091 |
| | | | 385/13 |
| 10,337,539 B1 * | 7/2019 | Shah | F15D 1/0075 |

(Continued)

OTHER PUBLICATIONS

Butler, Estimation of Morphing Airfoil Shapes and Aerodynamic Loads Using Artificial Hair Sensors (Year: 2015).*

(Continued)

*Primary Examiner* — Mohammad K Islam
(74) *Attorney, Agent, or Firm* — AFMCLO/JAZ; Matthew Fair

(57) ABSTRACT

Systems and associated methods for utilizing an artificial hair sensor to gather fluid flow data sensed on a surface. The artificial hair sensors are disposed on a surface to acquire flow sensory data in approximately real-time and for a plurality of dynamic flow parameters on the surface. The sensory data is based on a quantity of the artificial hair sensors that can be configured in an array of sensors. A mapping module, such as a neural network, is operatively coupled to the artificial hair sensor array and receives the sensory data acquired by the artificial hair sensors and generates a time-varying signal, which is based on the quantity of dynamic parameters. A real-time representation of the time-varying signal is generated.

20 Claims, 24 Drawing Sheets

(51) Int. Cl.
*G06F 16/9038* (2019.01)
*G06N 3/02* (2006.01)
*B82Y 10/00* (2011.01)

(56) References Cited

U.S. PATENT DOCUMENTS 10,875,658 B2 * 12/2020 Evulet .................. B64C 23/00
2013/0283922 A1 * 10/2013 Qualtieri .............. H01L 41/25
73/774

OTHER PUBLICATIONS

B. T. Dickinson, J.R. Singler, B.A. Batten, Mathematical modeling and simulation of biologically inspired hair receptor arrays in laminar unsteady flow separation, Journal of Fluids and Structures, vol. 29, 2012, pp. 1-17.
Junliang Tao and Xiong (Bill) Yu, Hair flow sensors: from bio-inspiration to bio-mimicking—a review, Smart Materials and Structures, vol. 21, No. 11, Sep. 21, 2012.
Olivier Dangles, Christelle Magal, Dominique Pierre, Aurélie Olivier, Jérôme Casas, Variation in morphology and performance of predator-sensing system in wild cricket populations, Journal of Experimental Biology 2005 208: 461-468.
Siva Mangalam, Arun Mangalam, and Peter Flick. "Unsteady Aerodynamic Observable for Gust Load Alleviation and Flutter Suppression", 26th AIAA Applied Aerodynamics Conference, Guidance, Navigation, and Control and Co-located Conferences, Aug. 2008.
Matthew R. Maschmann, Gregory J. Ehlert, Benjamin T. Dickinson, David M. Phillips, Cody W. Ray, Greg W. Reich, Jeffery W. Baur, Bioinspired Carbon Nanotube Fuzzy Fiber Hair Sensor for Air-Flow Detection, Advanced Materials, vol. 26, Issue 20, May 2014, pp. 3230-3234.
Keith Slinker; Matthew R. Maschmann; Corey Kondash; Benjamin Severin; David Phillips; Benjamin T. Dickinson; Gregory Reich; Jeff Baur, Variable deflection response of sensitive CNT-on-fiber artificial hair sensors from CNT synthesis in high aspect ratio microcavities, Proc. SPIE 9429, Bioinspiration, Biomimetics, and Bioreplication 2015, 942917 (Mar. 26, 2015).
K. Slinker, C. Kondash, M. Maschmann, B. Severin, G.W. Reich, B.T. Dickinson, J. Baur, "Artificial Hair Sensors from Structural Microfibers and CNT Arrays for Sensing Air Flow or Mechanical Shear", 20th International Conference on Composite Materials, 2015.
Benjamin Dickinson, Stephen McClain, Lance Case, The Dynamic Response of Quasi-Steady Hair-Like Structures in Oscillatory Boundary Layer Flows, Conference: 6th AIAA Flow Control Conference, Jun. 2012.
Dickinson B T 2009 Detecting Fluid Flows with Bioinspired Hair Sensors PhD Thesis Oregon State University Corvallis, OR.
Kaman Thapa Magar, Gregory W. Reich, Matthew R. Rickey, Brian M. Smyers and Richard V. Beblo, Aerodynamic Characteristics Prediction via Artificial Hair Sensor and Feedforward Neural Network, ASME 2015 Conference on Smart Materials, Adaptive Structures and Intelligent Systems, vol. 2: Integrated System Design and Implementation; Structural Health Monitoring; Bioinspired Smart Materials and Systems; Energy Harvesting, Colorado Springs, Colorado, USA, Sep. 21-23, 2015.
Kaman Magar, Gregory W. Reich, Matthew Rickey, Brian Smyers, Richard Beblo, Aerodynamic Parameter Prediction on a Airfoil with Flap via Artificial Hair Sensors and Feedforward Neural Network, Conference: 54th AIAA Aerospace Sciences Meeting, Jan. 2016.
Weihua Su, Gregory W. Reich, Gust Alleviation of Highly Flexible UAVs with Artificial Hair Sensors, Conference: SPIE Smart Structures/NDE Conference 2015, vol. SPIE 9435, Mar. 2015.
R. K. Jaganatharaja et al., "Highly-sensitive, biomimetic hair sensor arrays for sensing low-frequency air flows," Transducers 2009—2009 International Solid-State Sensors, Actuators and Microsystems Conference, Denver, CO, 2009, pp. 1541-1544.
Chang Liu, Micromachined biomimetic artificial haircell sensors, Bioinspiration & Biomimetics 2(4):S162-9, Jan. 2008.
Magar KT, Reich GW, Kondash C, Slinker K, Pankonien AM, Baur JW, Smyers B., Aerodynamic parameters from distributed heterogeneous CNT hair sensors with a feedforward neural network, Bioinspir Biomim. Nov. 10, 2016;11 (6):066006.
S. M. Mangalam, "Phenomena-based real-time aerodynamic measurement system (PRAMS)," 2003 IEEE Aerospace Conference Proceedings (Cat. No. 03TH8652), Big Sky, MT, USA, 2003, pp. 3347-3356.
Matthew R Maschmann et al., Force sensitive carbon nanotube arrays for biologically inspired airflow sensing, 2012 Smart Mater. Struct. 21 094024.
D M Phillips et al., Detection of flow separation and stagnation points using artificial hair sensors, 2015 Smart Mater. Stuct. 24 115026.
Slinker K. A., Kondash C., Dickinson B. T., Baur J. W. (2016). CNT-Based Artificial Hair Sensors for Predictable Boundary Layer Air Flow Sensing. Adv. Mater. Technol., 1: 1600176, Nov. 2016.
Keith Slinker, Corey Kondash, Benjamin T. Dickinson, Jeffery W. Baur, High-Bandwidth and Sensitive Air Flow Sensing Based on Resonance Properties of CNT-on-Fiber Hairs, C 2017, 3(1), 6.
J.M. Zook, The neuroethology of touch in bats: cutaneous receptors of the bat wing, Dept. Biological Sci., Ohio U., Athens, OH, 2005.
Sterbing-D'Angelo, Susanne & Chadha, Mohit & Chiu, Chen & Falk, Benjamin & Xian, Wei & Barcelo, Janna & M Zook, John & Moss, Cynthia. (2011). Bat wing sensors support flight control. Proceedings of the National Academy of Sciences of the United States of America. 108.

\* cited by examiner

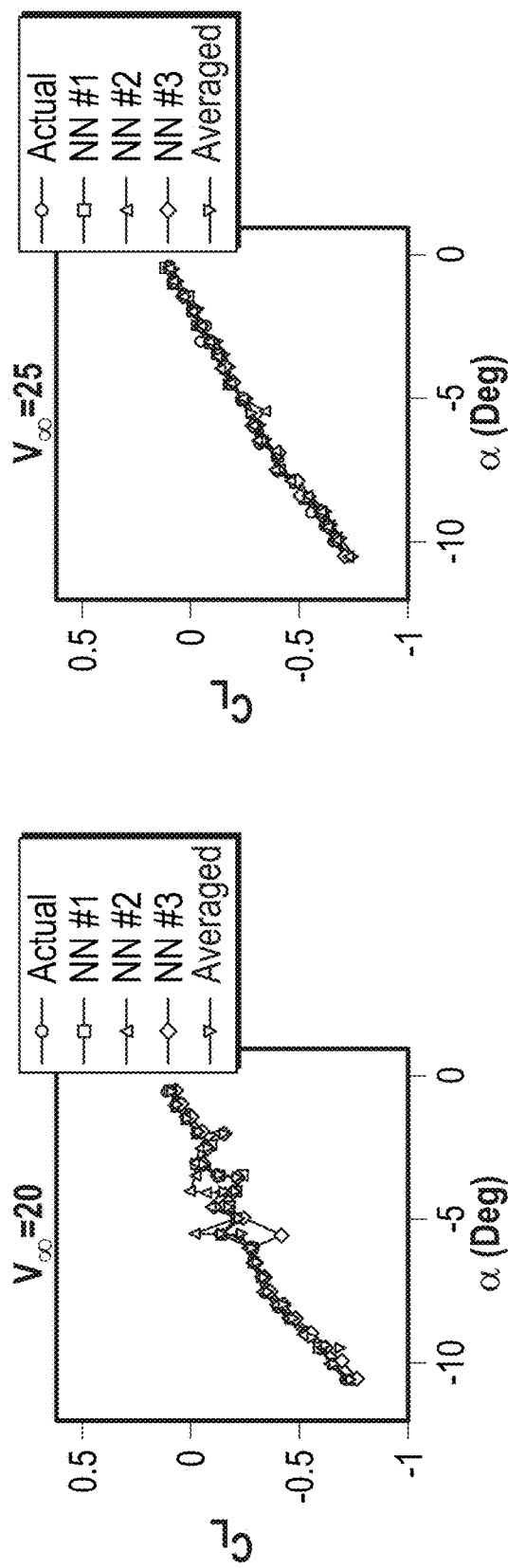
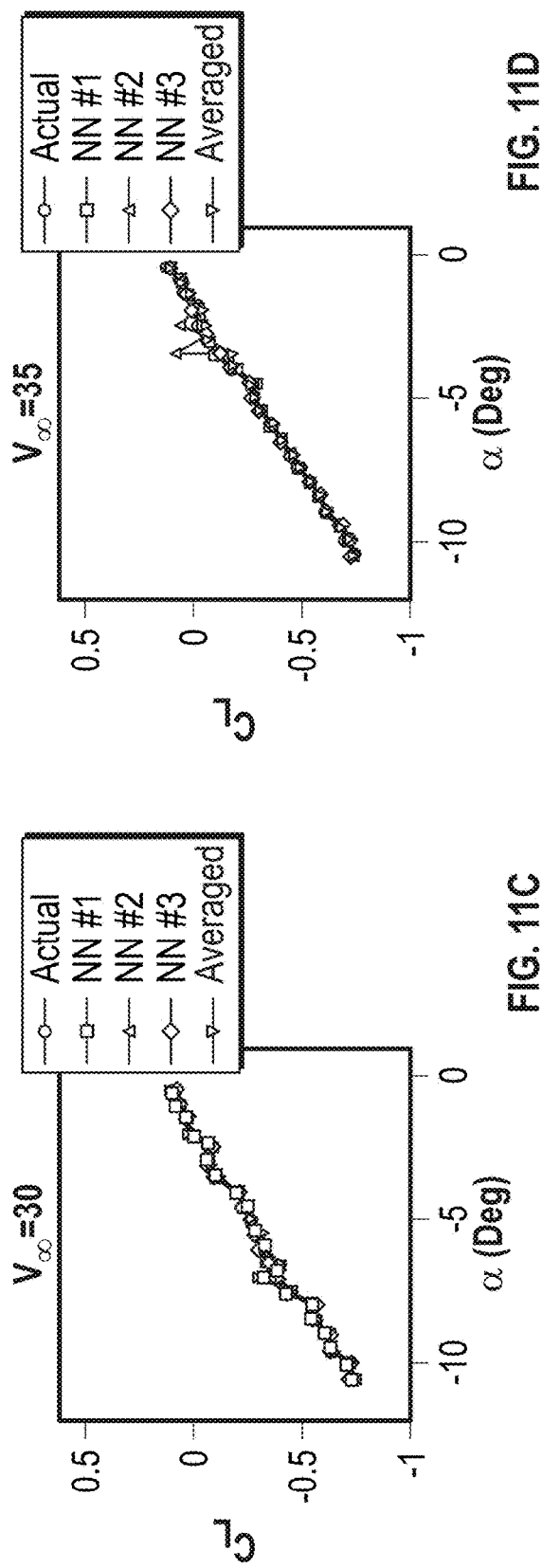
FIG. 11A
FIG. 11B
FIG. 11C
FIG. 11D

SYSTEM, APPARATUS AND METHOD FOR PREDICTING AERODYNAMIC PARAMETERS USING ARTIFICAL HAIR SENSOR ARRAY

CROSS-REFERENCE TO RELATED APPLICATION

This non-provisional patent application claims the benefit of U.S. Provisional Application No. 62/573,776, filed on Oct. 18, 2017, and titled "Simultaneous Prediction of Aerodynamic Parameters Using Artificial Hair Sensor Array and Artificial Neural Network", the entire content of which is incorporated herein by reference.

STATEMENT OF GOVERNMENT INTEREST

The invention described herein may be manufactured, used, and licensed by or for the Government of the United States for all governmental purposes without the payment of any royalty.

BACKGROUND

Fly-by-feel is a paradigm in which an aerial system uses smart sensors to assess the real time flow state or to feel the environment and implements intelligent control with smart actuators to increase the flight agility, stability, and maneuverability. A large number of sensors are required to realize a fly-by-feel system. Therefore, such sensors must be lightweight, have small manufacturing costs, and small footprints.

Natural fliers such as bats, locusts, and crickets use distributed arrays of hair sensors to feel the flow and to increase flight maneuverability and agility. Moreover, the hairs of these fliers have varying morphology in terms of numbers, thickness, distribution, and lengths that helps to detect a wide range of flow conditions. Mimicking the distributed sensing capabilities and heterogeneity in sensors of these natural fliers helps to realize an effective fly-by-feel concept.

SUMMARY OF THE INVENTION

Embodiments described herein are directed to a system comprising one or more artificial hair sensors disposed on a surface to acquire flow sensory data in real-time of a plurality of dynamic parameters of the surface, the sensory data being a function of a quantity of the artificial hair sensors. A mapping module is operatively coupled to the plurality of artificial hair sensors. The mapping module is adapted to receive the sensory data acquired by the artificial hair sensors and generate a time-varying signal, where the time-varying signal is a function of a quantity of the dynamic parameters. A processor is operatively coupled to the mapping module and is adapted to receive the time-varying signal and generate a real-time representation of the time-varying signal.

Another embodiment is directed to the system where the real-time representation of the time-varying signal represents sensed flow phenomena.

Yet another embodiment is directed to the system where the flow phenomena comprise: turbulence, gust, separation of flow, transition from laminar flow to turbulent flow, and a stagnation point.

Yet another embodiment is directed to the system where the real-time representation of the time varying signal is an estimate of aerodynamic characteristics sensed by the plurality of artificial hair sensors.

Yet another embodiment is directed to the system where the real-time representation of the time varying signal is a prediction of aerodynamic characteristics.

Yet another embodiment is directed to the system where the one or more of artificial hair sensors comprises glass hairs.

Yet another embodiment is directed to the system further comprising a carbon nanotube forest in co-axial orientation.

Yet another embodiment is directed to the system where the mapping module comprises one or more neural networks.

Yet another embodiment is directed to the system where the neural network processes time dependent signals.

Yet another embodiment is directed to the system where the real-time representation of the time-varying signal includes a signal power parameter predicted over a dynamic range.

Yet another embodiment is directed to the system where a determination of the time-varying signal is a function of a sensed signal power quantity.

Yet another embodiment is directed to the system where the real-time representation of the time-varying signal comprises an estimate over a linear dynamic range.

Yet another embodiment is directed to the system further comprising a plurality of bridge circuits, each one of the plurality of bridge circuits associated with a corresponding artificial hair sensor.

Yet another embodiment is directed to the system where a hair length of each artificial hair sensor has a proportional ratio relative to a boundary layer of the surface.

Yet another embodiment is directed to the system where a position of each artificial hair sensor on the surface is a function of a hair length of the artificial hair sensor.

Yet another embodiment is directed to the system where each artificial sensor has a hair length, and the hair length is related to a mode of sensing by the artificial hair sensor.

Yet another embodiment is directed to the system where a sensitivity of an artificial hair sensor is a function of an associated carbon nanotube (CNT).

Yet another embodiment is directed to the system where the time-varying signal has a frequency greater than approximately 500 hertz.

Yet another embodiment is directed to the system where the time-varying signal has a frequency greater than approximately 1000 hertz.

Yet another embodiment is directed to the system where the plurality of aerodynamic parameters comprises time-varying lift, velocity, and moment characteristics.

Yet another embodiment is directed to the system where real-time representation of the time-varying signal includes a component of signal power data combined with pre-processed data.

Yet another embodiment is directed to the system where the sensory data comprises a combination of integrated flow measurements having a bandwidth with a magnitude that is approximately two orders of magnitude higher than an average bandwidth for non-glass artificial hair sensors.

Yet another embodiment is directed to the system where the time-varying signal comprises multiple time samples over a linear dynamic range.

Yet another embodiment is directed to the system where the time-varying signal comprises broad frequency spectrum flow disturbances and gusts.

Yet another embodiment is directed to the system where the hair length of some or all of the artificial hair sensors is tailored based on the location of the sensor.

Yet another embodiment is directed to the system where the hair length is proportional to the predicted or expected boundary layer thickness at the position of the sensor.

Yet another embodiment is directed to the system where moment sensitivity expressed as a fraction of the maximum change in response is greater than 0.02 $nN^{-1}$ $m^{-1}$.

Yet another embodiment is directed to the system where the product of the first natural resonance frequency (f) and the square of the hair length (L) of each artificial hair sensor is greater than 4000 Hz $mm^2$.

Yet another embodiment is directed to the system where moment sensitivity expressed as a fraction of the maximum change in response is also greater than 0.02 $nN^{-1}$ $m^{-1}$.

Yet another embodiment is directed to the system where the root mean square of the response of the artificial hair sensor is proportional to the magnitude and to the characteristic frequencies of the air flow.

Yet another embodiment is directed to the system where the root mean square of the response of the artificial hair sensor is proportional to the magnitude of the turbulent flow.

Yet another embodiment is directed to the system where the root mean square response of the artificial hair sensor is greater at the resonant frequencies of the sensor.

Yet another embodiment is directed to the system where the response of the sensor at its first resonance frequency is utilized.

Yet another embodiment is directed to the system where the response of the sensor at the frequencies corresponding to its second, third, fourth, and/or fifth resonance modes is utilized.

Yet another embodiment is directed to the system where the response of the artificial hair sensor is used to detect the transition from laminar to turbulent flow.

Yet another embodiment is directed to the system where the root mean square response of the artificial hair sensor is above the noise floor for air flows with Reynolds numbers above 1500.

Yet another embodiment is directed to the system where the change in the root mean square of the resistance of the artificial hair sensor due to a change in the Reynolds number of the air flow is also greater than 0.002 ohms.

Yet another embodiment is directed to the system where the root mean square response of the artificial hair sensor is above the noise floor for air flows with Reynolds numbers above 2000.

Yet another embodiment is directed to the system where the change in the root mean square of the resistance of the artificial hair sensor due to a change in the Reynolds number of the air flow is also greater than 0.002 ohms.

Still another embodiment is directed to a method that performs the steps of acquiring flow sensory data in real-time of a plurality of dynamic parameters of the surface. The sensory data is a function of a quantity of artificial hair sensors. A signal, which may be a time-varying signal, is generated. The signal (time-varying) is a function of a quantity of the dynamic parameters and the quantity of artificial hair sensors. A representation, which may be a real-time representation of the time-varying signal, is generated.

Another embodiment is directed to the method where the real-time representation of the time-varying signal represents sensed flow phenomena.

Yet another embodiment is directed to the method where the flow phenomena comprise: turbulence, gust, separation of flow, transition from laminar flow to turbulent flow, and a stagnation point.

Yet another embodiment is directed to the method where the real-time representation of the time varying signal is an estimate of aerodynamic characteristics sensed by the plurality of artificial hair sensors.

Yet another embodiment is directed to the method where the real-time representation of the time varying signal is a prediction of aerodynamic characteristics.

Yet another embodiment is directed to the method where the one or more artificial hair sensors comprises glass hairs.

Yet another embodiment is directed to the method further comprising utilizing a carbon nanotube forest in co-axial orientation.

Yet another embodiment is directed to the method where generating the time varying signal comprises processing by one or more neural networks.

Yet another embodiment is directed to the method further comprising processing time dependent signals by the one or more neural networks.

Yet another embodiment is directed to the method where the real-time representation of the time-varying signal includes a signal power parameter predicted over a dynamic range.

Yet another embodiment is directed to the method where a determination of the time-varying signal is a function of a sensed signal power quantity.

Yet another embodiment is directed to the method where the real-time representation of the time-varying signal comprises an estimate over a linear dynamic range.

Yet another embodiment is directed to the method further comprising accessing a plurality of bridge circuits, each one of the plurality of bridge circuits associated with a corresponding artificial hair sensor.

Yet another embodiment is directed to the method where a hair length of each artificial hair sensor has a proportional ratio relative to a boundary layer of the surface.

Yet another embodiment is directed to the method further comprising positioning each artificial hair sensor on the surface as a function of a hair length of the artificial hair sensor.

Yet another embodiment is directed to the method where each artificial sensor has a hair length and the hair length is related to a mode of sensing by the artificial hair sensor.

Yet another embodiment is directed to the method where a sensitivity of an artificial hair sensor is a function of an associated carbon nanotube (CNT).

Yet another embodiment is directed to the method where the time-varying signal has a frequency greater than approximately 500 hertz.

Yet another embodiment is directed to the method where the time-varying signal has a frequency greater than approximately 1000 hertz.

Yet another embodiment is directed to the method where the plurality of aerodynamic parameters comprises time-varying lift, velocity, and moment characteristics.

Yet another embodiment is directed to the method where real-time representation of the time-varying signal includes a component of signal power data combined with pre-processed data.

Yet another embodiment is directed to the method where the sensory data comprises a combination of integrated flow measurements having a bandwidth with a magnitude that is approximately two orders of magnitude higher than an average bandwidth for non-glass artificial hair sensors.

Yet another embodiment is directed to the method where the time-varying signal comprises multiple time samples over a linear dynamic range.

Yet another embodiment is directed to the method the time-varying signal comprises broad frequency spectrum flow disturbances and gusts.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

The accompanying drawings provide visual representations which will be used to more fully describe various representative embodiments and can be used by those skilled in the art to better understand the representative embodiments disclosed and their inherent advantages. The drawings are not necessarily to scale, emphasis instead being placed upon illustrating the principles of the devices, systems, and methods described herein. In these drawings, like reference numerals may identify corresponding elements.

FIG. 2A shows a schematic of an AHS (artificial hair sensor). FIG. 2B shows a sectional view of a single sensor.

FIG. 2C shows a SEM image of a single hair sensor. FIG. 2D shows array of three hair sensors.

FIG. 3A shows locations of sensor array on a NACA2410 airfoil. FIG. 3B shows a CAD model of a NACA2410 airfoil. FIG. 3C shows a 3-D printed NACA2410 wing. FIG. 3D shows the removable skin section with hair sensors and silver trace.

FIG. 4A shows top sensors. FIG. 4B shows bottom sensors. FIG. 4C shows sensor T3 response to initialization. FIG. 4D shows normalized response curve of sensor T3 to initialized resistance values.

FIG. 5A shows a data acquisition system. FIG. 5B shows a schematic of the bridge circuit. FIG. 5C shows a wind tunnel installation.

FIG. 6A shows a top sensor (T3) at a=−11°. FIG. 6B shows a top sensor (T3) at a=11°. FIG. 6C shows a bottom sensor (B9) at a=11°. FIG. 6D shows a bottom sensor (B9) at a=−11°.

FIG. 10A shows lift coefficient. FIG. 10B shows moment coefficient. FIG. 10C shows an angle of attack. FIG. 10D shows free-stream velocity.

FIGS. 11A, 11B, 11C, 11D, 11E, 11F, 11G and 11H illustrate variation in prediction error with individual neural network (only three out of ten neural network predictions are presented) and averaged response of ten neural networks for lift coefficient and moment coefficient.

FIG. 13A shows CI prediction. FIG. 13B shows CM prediction.

FIG. 14A shows RMS error in lift coefficient prediction. FIG. 14B shows RMS error in moment coefficient prediction.

FIG. 15A a shows free-stream velocity. FIG. 15B shows an angle of attack.

Figure 1:
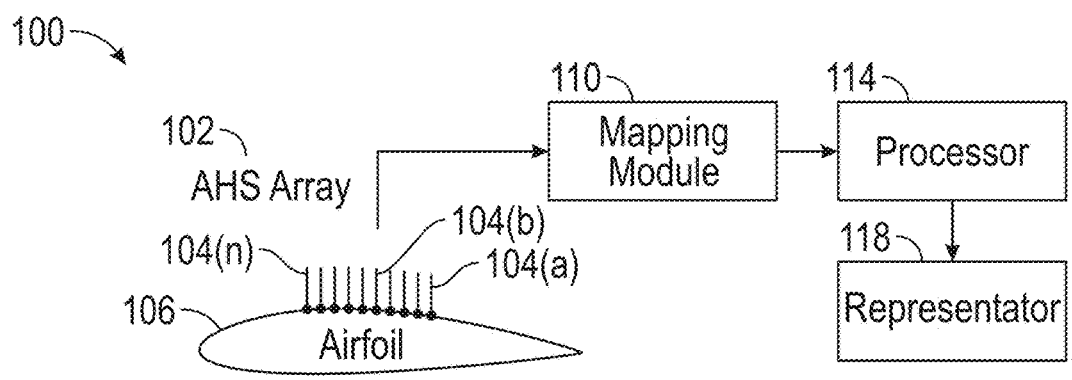
FIG. 1 illustrates a data acquisition system schematic to measure sensor resistance.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION

Specific embodiments of the disclosure will now be described in detail with reference to the accompanying figures. While this invention is susceptible of being embodied in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals may be used to describe the same, similar or corresponding parts in the several views of the drawings.

The aerodynamic states in an aerial system, are derived from the structural states; therefore, there is an inherent delay due to inertia of the system. Such delays, if not addressed properly, have an adverse effect on the performance of closed loop control systems. Prediction of aerodynamic parameters from structural parameters becomes more erroneous due to the presence of uncertainty in mathematical modeling if the system becomes more flexible. Having a sensor and a system capable of predicting the real-time force and moments directly from the flow may assist in improving the flight performance by significantly reducing delays.

The disclosed embodiments include a system comprising one or more artificial hair sensors disposed on a surface to acquire flow sensory data in real-time of a plurality of dynamic parameters of the surface, where sensory data is a function of a quantity of the artificial hair sensors. A mapping module is operatively coupled to the plurality of artificial hair sensors, the mapping module adapted to receive the sensory data acquired by the artificial hair sensors and generate a time-varying signal. The time-varying signal is a function of a quantity of the dynamic parameters. A processor is operatively coupled to the mapping module, the processor being adapted to receive the time-varying signal and generate a real-time representation of the time-varying signal.

Additionally, the real-time representation of the time-varying signal represents sensed flow phenomena. The flow phenomena comprise: turbulence, gust, separation of flow, transition from laminar flow to turbulent flow, and a stagnation point.

Furthermore, the real-time representation of the time varying signal is an estimate of aerodynamic characteristics sensed by the plurality of artificial hair sensors. The real-time representation of the time varying signal is a prediction of a response by the surface to the aerodynamic characteristics sensed by the plurality of artificial hair sensors.

It is also an embodiment that the plurality of artificial hair sensors comprises glass hairs. Additionally, the sensor comprises a carbon nanotube forest in co-axial orientation.

Additionally, the mapping module comprises one or more neural networks. The neural network processes time dependent signals.

The real-time representation of the time-varying signal includes a signal power parameter predicted over a dynamic range.

A determination of the time-varying signal is a function of a sensed signal power quantity.

The real-time representation of the time-varying signal comprises an estimate over a linear dynamic range.

The system described herein further comprises one or more bridge circuits, each one of the bridge circuits associated with a corresponding artificial hair sensor. The hair length of each artificial hair sensor has a proportional ratio relative to a boundary layer of a surface.

A position of each artificial hair sensor on the surface is a function of a hair length of the artificial hair sensor (e.g., short hairs in front, long hairs in back).

Each artificial sensor has a hair length and the hair length is related to a mode of sensing by the artificial hair sensor. A sensitivity of an artificial hair sensor is a function of an associated carbon nanotube (CNT).

Another embodiment is that the time-varying signal has a frequency greater than approximately 500 hertz.

Another embodiment is that the time-varying signal has a frequency greater than approximately 1000 hertz.

Another embodiment is that the plurality of aerodynamic parameters comprises time-varying lift, velocity and moment characteristics.

The real-time representation of the time-varying signal includes a component of signal power data combined with pre-processed data.

The sensory data comprises a combination of integrated flow measurements having a bandwidth with a magnitude that is approximately two orders of magnitude higher than an average bandwidth for non-glass artificial hair sensors.

The time-varying signal comprises multiple time samples over a linear dynamic range. Also, the time-varying signal comprises broad frequency spectrum flow disturbances and gusts.

As described herein, the Reynolds number is used to study fluid flow and can be used to show whether the fluid flow is laminar or turbulent. The Reynolds number does not have any dimension. It represents inertial forces divided by viscous forces. The use of the Reynolds number herein is useful to quantify the flow dynamics of the AHS array and individual artificial hairs.

FIG. 1 shows a system 100 that includes an artificial hair sensor (AHS) array 102, at least one artificial hair 104, surface 106, mapping module 110, processor 114 and representation 118.

Artificial hair sensor (AHS) array 102 is comprised of one or more artificial hair sensors 104(a) . . . (n), where "n" is any suitable number. The artificial hair 104 may be made of glass and is used to sense flow phenomena, such as turbulence, gust, separation of flow, transition from laminar flow to turbulent flow, a stagnation point, and other flow dynamic property. The one or more artificial hairs 104 are mounted on a surface 106.

Surface 106 is any suitable surface, such as an airplane wing, airplane fuselage, helicopter blade, windmill vane, windmill blade, submarine sail, sail plane, stern plane, rudder, propeller, drive plane, turbine blade, or other surface subject to flow dynamics.

This flow may be a fluid flow. A fluid may be in a gas state, or a liquid state or a combination of a portion gas and a portion liquid. The embodiments described herein apply to either an air flow or a liquid flow. The embodiments apply to air flow over a surface, such as an aircraft wing, or rotor, or fuselage. The embodiments described herein also apply to a liquid flow such as water over a submarine turbine, or other part of a submarine.

The artificial hairs 104 sense fluid flow over surface 106. The artificial hairs 104 provide data to mapping module 110.

Mapping module 110 may be a combination of hardware and/or software suitable for manipulating the sensed data received from hair 104. The mapping module may comprise one or more neural networks, or other processing software code, algorithm and/or hardware apparatus or component.

Mapping module 110 is operatively coupled to processor module 114. Processor module 114 is used to process and manipulate the data from mapping module 110. Processor module 114 has sufficient memory and processing capability to generate a representation 118 of the sensed data from sensor 104. The processor module 114 may be any suitable computer having computational functionality, processing, memory and input/output components.

The surface flow-sensing scheme shown in FIG. 1 may be used with a distributed array 102 of sensors 104. In such a sensing scheme with large numbers of spatially distributed sensors 104, few faulty sensors do not degrade the performance of an entire array of the sensors, hence it is inherently robust and fault tolerant.

Embodiments as described herein apply to cryogenic freezing of tissue.

Artificial Hair Sensors (AHS) 104 are small sensors, typically having a hair length of approximately 50 micrometers to 1000 micrometers. The sensors 104 are suitably placed on the surface 106 of a wing or airfoil and sense local flow over the surface. Embodiments implement the use of arrays of these sensors in predicting overall lift and moment forces on the wing or airfoil (106) as well as freestream velocity, angle of attack, flap angle, and other parameters.

Artificial Neural Networks, which may be used as mapping module 110 may be used to create a nonlinear input-output mapping between AHS 104 response and aerodynamic parameters of interest, and once trained these mappings can be applied to sensor responses to produce real-time estimates of parameters of interest.

Distributed arrays 102 of artificial hair sensors 104 have bio-like sensing capabilities to obtain spatial and temporal surface flow information, which is one aspect of a fly-by-feel system. The spatiotemporal surface flow measurement enables further exploration of additional flow features such as flow stagnation, separation, and reattachment points. Due to their inherent robustness and fault tolerant capability, distributed arrays 102 of hair sensors 104 are well equipped to assess the aerodynamic and flow states in adverse conditions.

Embodiments described herein illustrate local flow measurement from an array 102 of artificial hair sensors 104 in a wind tunnel experiment with a feedforward artificial neural network to predict aerodynamic parameters such as lift coefficient, moment coefficient, free-stream velocity, and angle of attack on an airfoil. Knowledge of these parameters are useful to determining real time forces and moments which facilitates effective control design to increase flight agility, stability, and maneuverability.

Aerodynamic parameters such as free-stream velocity, angle of attack, lift coefficient, and moment coefficient play are used in design and performance of an aircraft, windmills, submarines, helicopters and other apparatus having wings, vanes, rotors, blades or other surface that is subject to fluid flow (fluid being either a liquid and/or gas phase or a combination of liquid phase and gas phase). These fluid parameters, along with structural parameters such as strain at a wing root, help to evaluate the forces and moments acting on a wing, blade, vane or rotor or other surface or object.

Knowledge of these forces and moments are useful in to evaluate the performance of an aircraft, watercraft, windmill in different fluid dynamic conditions. These forces and moments can also be used to predict other structural properties; such as local pitch and displacement of aircraft wing; that are important from a control perspective to stabilize the craft in adverse conditions as well as to increase the life of structures by reducing the loads.

There are two subsets of aerodynamic parameters in general: air data that consists of air speed, angle of attack, and aerodynamic coefficients that consists of lift and moment coefficients. Aerodynamic parameter estimation methods are either focused on predicting certain parameters or predicting other unknown parameters based on measurement of certain subset of parameters.

These systems use inertial sensors and pointwise accurate aerodynamic sensors such as hot wire anemometer that measure the temporal variation of certain aerodynamic parameters to evaluate the desired parameters. Although using multiple sensors might give a reliable set of data for aerodynamic parameter prediction, it is not practical due to expense and large footprints that obstruct the flow.

Estimation systems also use some kind of dynamic model of craft to design the parameter estimator. The major issues of using dynamic models are the inaccuracy in the model due to modeling error and linearization, and inherent delay in prediction due to aircraft inertia.

Embodiments described herein consider the ability to predict the aerodynamic parameters such as air speed, angle of attack, lift, and moment simultaneously, easy integration of many hair sensors on the surface of aircraft without obstructing the flow and use of surface flow measurement that determines the force and moments instead of estimating or deriving them through structural models thereby reducing the delay significantly.

With aircraft moving towards "fly-by-feel" concepts, where large number of sensors are deployed throughout the surface to extract the flow features in order to assess the aerodynamic states, and large number of actuators are used to achieve the desired flight objective such as maneuverability, stability, load reduction, and flutter suppression.

The surface pressure distribution and wall shear stress, depending on body, determine the force and moments which results in the quasi-steady force and moment coefficients on an aircraft. Since this surface pressure and wall shear depend on the surface flow, measuring these features enables estimation of other important aerodynamic information that helps to enhance the flight performance. Besides, capturing the surface flow features directly help to estimate the related aerodynamic parameter without any delay that are usually introduced by system's inertia in existing parameter estimation methods.

Artificial Hair Sensors (AHS) are effective in measuring the surface flow features. Because of their small footprints, low cost and power consumption, and easy integrability, they can be deployed throughout the desired surface area to capture these features. These measurements can reveal important information about the flow such as surface pressure distribution, flow stagnation, separation and reattachment points that can be used to design an appropriate control system to increase the life of the structure by reducing the structural loads and also to enhance the stability by alleviating gusts and other flow perturbations.

Using a distributed array of hair sensors also has advantages in terms of robustness because of redundant data obtained from many sensors. When used appropriately, the array of AHS can tolerate faulty measurements from a subset of sensors as long as the majority of sensors measurement is reliable. Compared to pointwise accurate measurement system which gathers the temporal information at certain point, the distributed array of hair sensors is capable of sensing both temporal and spatial distribution of flow features that also facilitates extraction of useful aerodynamic parameters.

Embodiments are directed to predicting aerodynamic parameters such as air velocity (V), angle of attack, free stream velocity, lift coefficient (CL), and moment coefficient (CM), and combinations thereof, in an airfoil simultaneously by using an artificial neural network and the local surface flow measurement obtained from arrays of artificial hair sensors.

This estimation system consists of a scheme to drill a hole and integrate the hair sensor on the desired surface, a scheme to make an array of hair sensors with each of sensor connected in parallel to an appropriate fixed value resistance based on the bridge circuit, a data acquisition system to measure the resistance of the hair sensors, a normalizing scheme to normalize the sensors resistance so that their values are consistent and falls in the range of approximately [0, 1], and feedforward neural network that takes the measurement from the hair sensor as input and estimates the desired aerodynamic parameters.

The hair length of some or all of the artificial hair sensors 102 is tailored based on the location of the sensor on the surface and the hair length may be proportional to the predicted or expected boundary layer thickness at the position of the sensor.

Figure 2A:
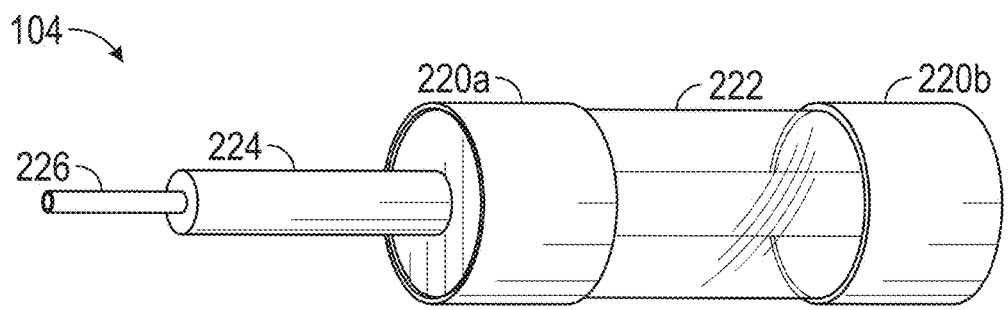
FIGS. 2A, 2B, 2C and 2D illustrate an artificial hair sensor.

FIG. 2A shows an artificial hair sensor (AHS) 104 that mimics hair sensors used by natural fliers (bats, crickets) to detect surface flow features. The AHS 104 consists of a S-2 glass fiber 226 with radially grown carbon nanotube (CNT) forests 224 on it. The glass fiber 226, which is approximately 8 µm in diameter, is inserted in a capillary 222, which has an outside diameter of approximately 350 µm and an inside diameter of approximately 25 µm inside a diameter-pore opening that has two electrodes 220(*a*) and 220(*b*).

Figure 2B:
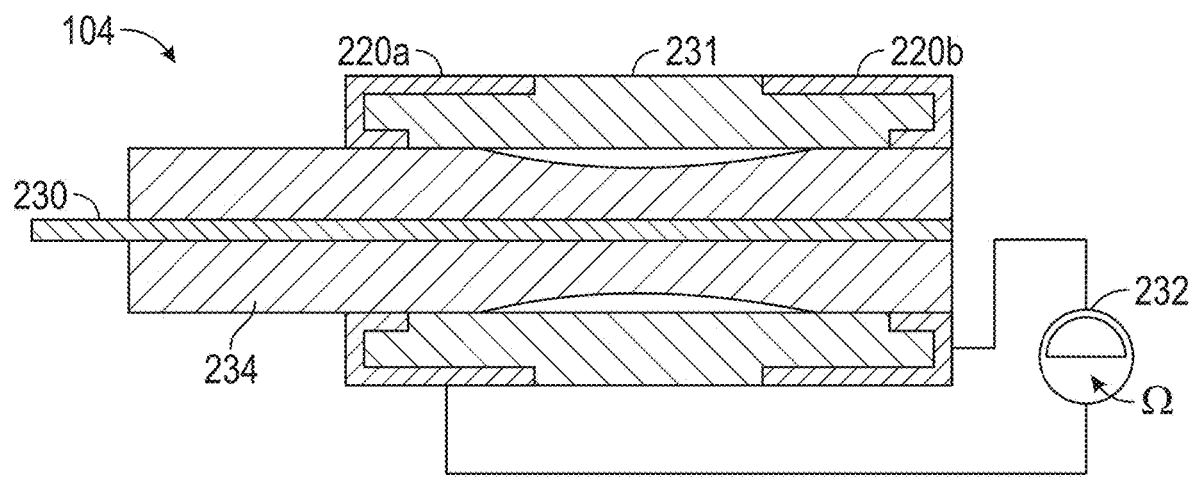

FIG. 2B shows that the capillary (222) and fiber (226) are then placed in a growth furnace where the compressed CNT forests 234 are grown radially from the fiber so that the total fiber plus CNT diameter is between approximately 10-25 μm inside the capillary pore 231. The surface flow features 230 such as surface flow velocity are measured as the change in resistance 232 between two electrodes 220(*a*) and 220(*b*) due to shaft deflection and subsequent CNT compression.

Figure 2C:
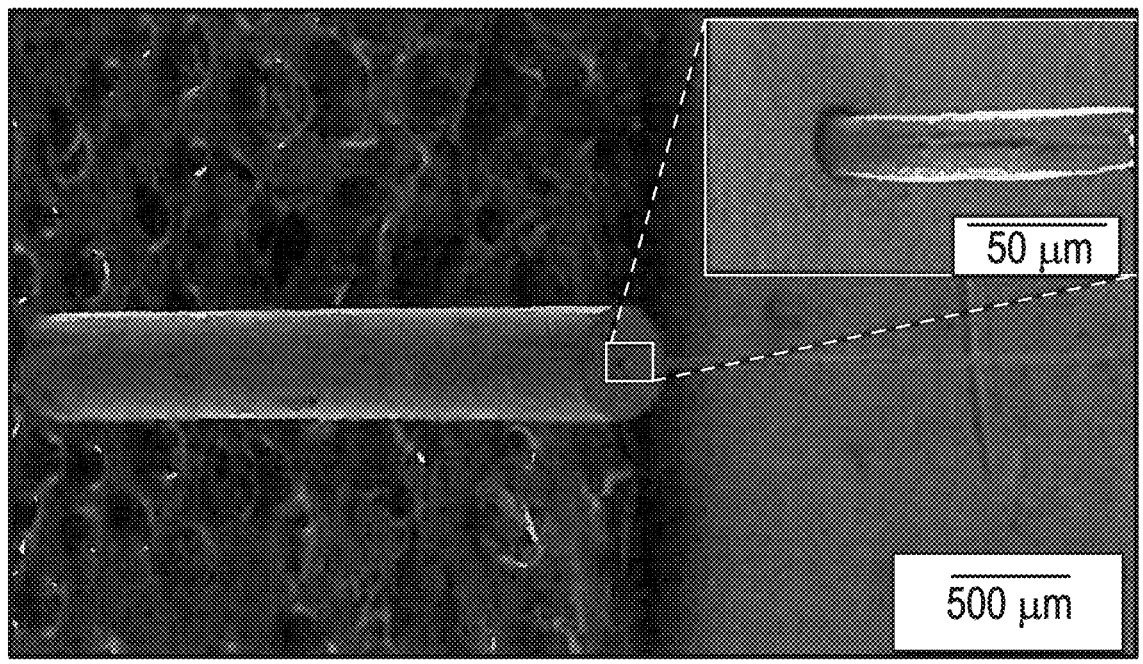
Figure 2D:
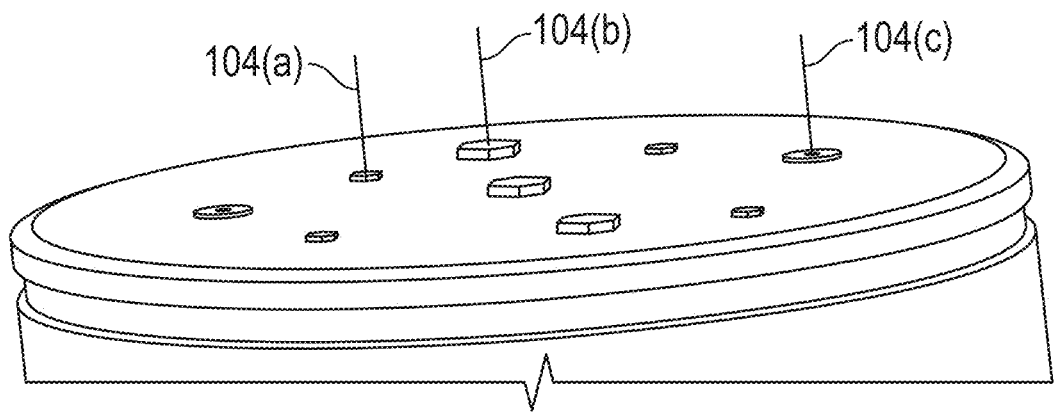

FIGS. 2C and 2D show sensors 104(*a*), (*b*) and (*c*), have the desired characteristics to be the distributed flow sensors: the weight of these sensors are approximately 50 the power consumption is approximately 10-20 μW, and their manufacturing cost is expected to be very low. Their small footprints of approximately 350 μm and easy integrability as a "hair plug" in design on host skins make them ideal candidates to use as spatially distributed surface flow sensors. Compared to typical MEMs sensors, these sensors are more sensitive and can be fabricated with much longer hairs to extend farther out of the boundary layer. Not only is longer-hair fabrication possible, it can be done without sacrificing bandwidth. Their sensitivity to detect small flow changes (approximately 0.1 m/s) and high bandwidth (>1 kHz) are also ideal characteristics for an effective fly-by-feel implementation. It is an embodiment to place the shorter length hairs toward a first surface of an object and the longer length hairs toward a second surface of an object. FIG. 2C shows view 240.

Besides analysis and characterization, there are other applications of this hair sensor to enhance flight control. For instance, a linear quadratic Gaussian (LQG) estimator has been designed to estimate the fluctuation in Stokes velocity field in the square region using the wall measurement of AHS. This estimate, along with the quasi-steady hair sensor model, is used for a snap-shot linear feedback flow control design.

Another example of AHS application is heading angle estimation based on the hair sensor measurement and the information is used to design an optimal controller for gust alleviation on a highly flexible unmanned aerial vehicle (UAV). Moreover gust loads may be predicted from the AHS measurement, where the AHS measurement of local flow velocity is fed through a recurrent artificial neural network to predict lift and moment in gusty environment. The predicted gust information can be incorporated in gust alleviation control thereby enhancing the navigation and maneuverability.

The AHS is used to detect the boundary layer flow, which is used to maintain a laminar attached boundary layer flow and reduce the skin friction drag. The local velocity measurement from the AHS array can be combined with a feed-forward neural network to effectively predict the aerodynamic parameters such as lift and moment coefficient, free-stream velocity, and angle of attack on an airfoil. Real-time force and moments are obtained from these parameters which are effective in gust load alleviation on UAV. Also, the hair sensor can be used to detect the flow separation and stagnation point in a cylinder.

Because of their small footprint (approximately 350 μm OD of capillary), the artificial hair sensors can be integrated into a host skin by drilling a small hole in which to insert the sensor package without modifying the host skin structure and affecting the surface flow. A 6" chord and 12" span NACA2410 airfoil is used for a wind tunnel test. Two arrays of sensor locations, one on the top and another on the bottom, are selected having ten sensors on each array.

Figure 3A:
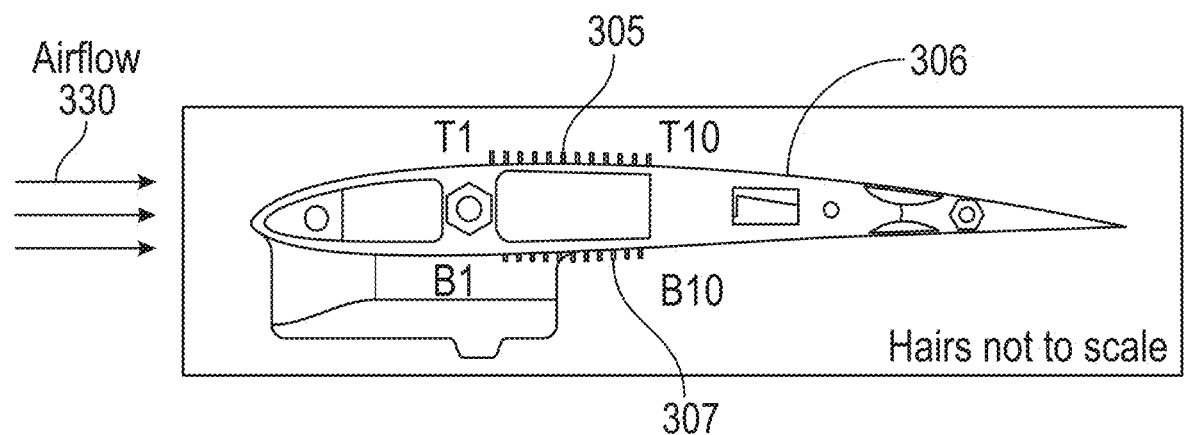
FIGS. 3A, 3B, 3C and 3D illustrate sensor array integration.
Figure 3B:
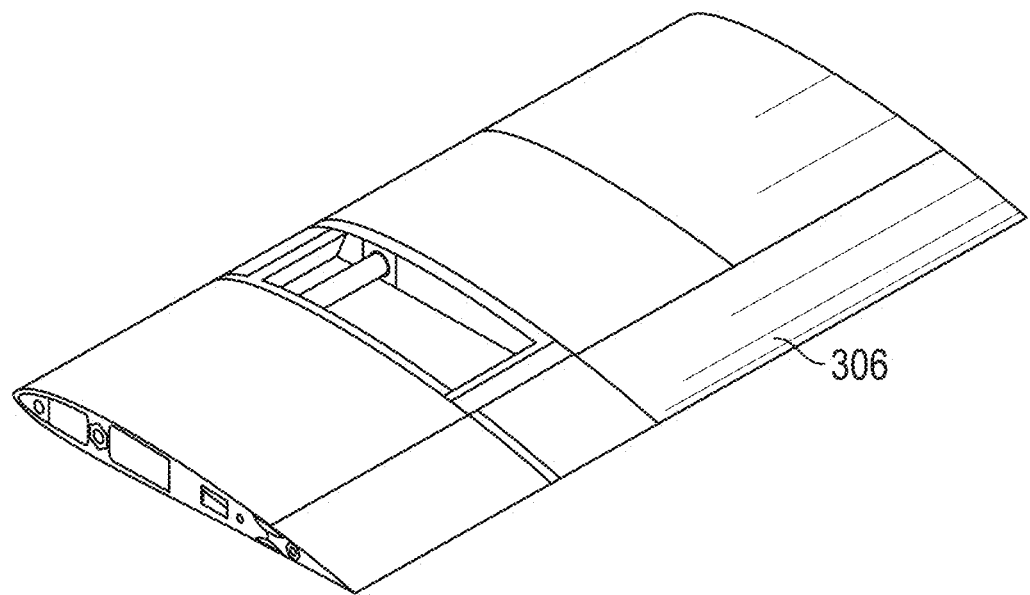

As shown in FIGS. 3A, 3B, 3C and 3D, on each array (top and bottom), the sensor locations were separated by approximately 0.17" on surface 306 with airflow 330. The top and bottom sensor locations were named T1-T10, 305, and B1-B10, 307, respectively, as shown in FIG. 3A. A CAD model of the wing section is shown in FIG. 3B, which has a small section of wing 306 containing a removable skin to facilitate easy integration and wiring. Both the wing section and the removable skin section were constructed with a 3-D printer.

Figure 3C:
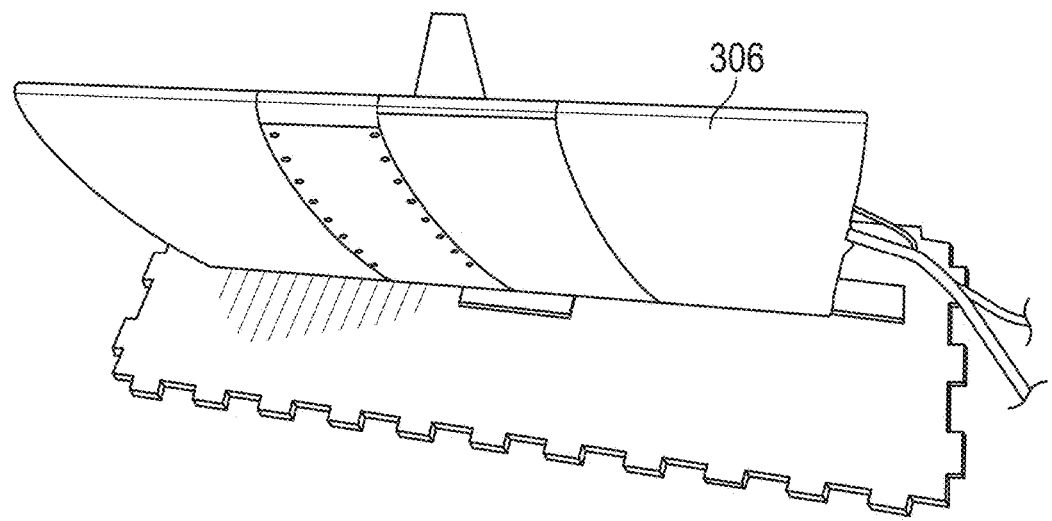
Figure 3D:
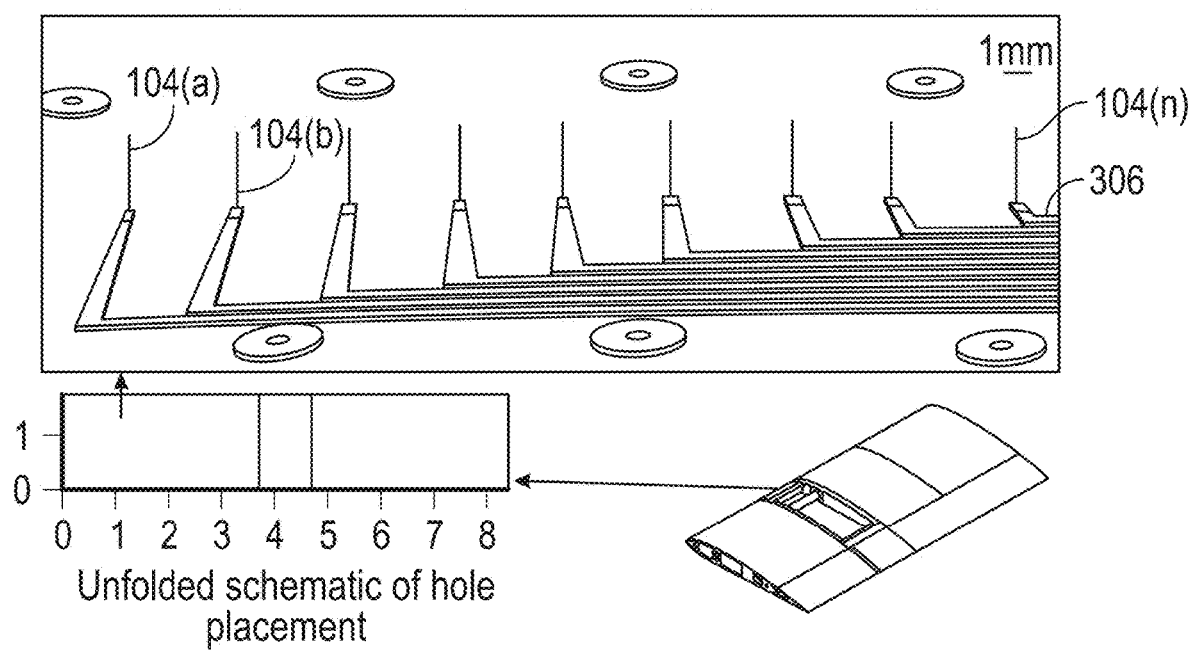

Holes with 0.014" (approximately 356 μm) diameter were drilled at the sensor integration locations and silver traces were painted from the hole to the edge of the removable skin section to attach wires for DAQ circuit connection as shown in FIGS. 3C and 3D.

A total of 20 AHS were manufactured and calibrated before use in the wind tunnel test. A typical sensor calibration process consists of measuring the base (or undeflected) resistance ($R_0$) of the individual sensor, deflecting it with an instrumented razor blade at a point (L) from the base of the hair and measuring the resistance with changing deflection (δ) at that point.

Figure 18:
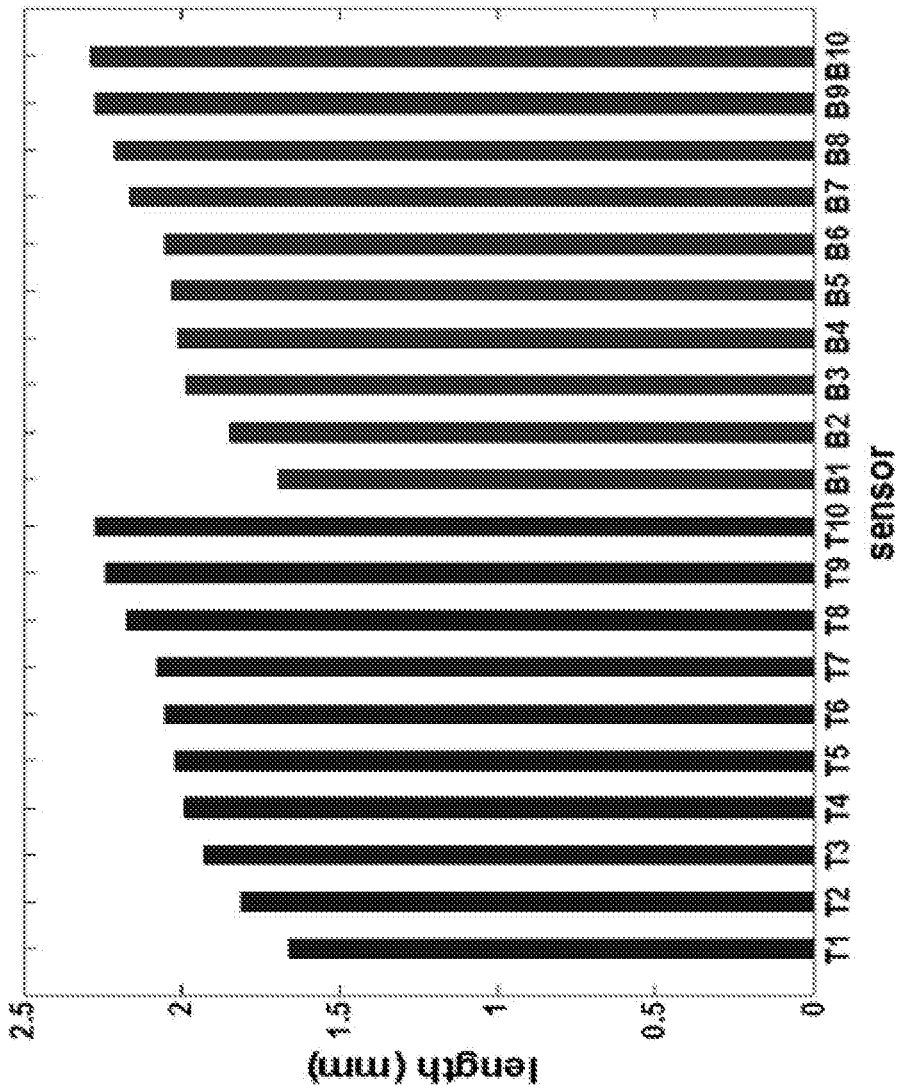
FIG. 18 shows the length of sensors used in accordance with an example embodiment.

FIG. 18 shows the length of sensors used. The hair sensors were initially manufactured with a standard length of approximately 4 mm.

Figure 16:
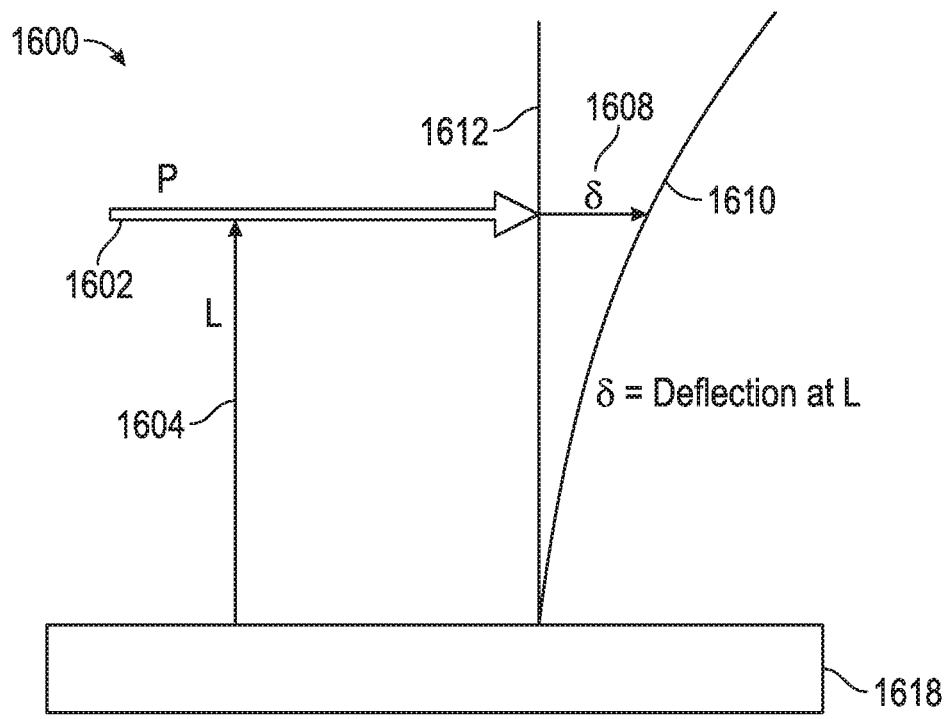
FIG. 16 shows a schematic of the calibration process.

A schematic of the calibration process is presented in FIG. 16.

FIG. 16 shows a system 1600, which includes a hair sensor 1612 that is mounted on surface 1618. The hair sensor 1612 is deflected, as shown by displaced sensor 1610 by a deflection quantity δ 1608. This deflection quantity δ 1608 is based on force P 1602 along length L 1604. If the deflection is large enough, the sensor response saturates and the resistance no longer changes. This saturation resistance is termed as minimum resistance ($R_{min}$), and the difference between undeflected and the saturated resistance is the maximum change in resistance (ΔR). Since each sensor has different resistance characteristics, they are normalized with $R_0$ and $R_{min}$ to have the sensor response in the range of approximately [0 1] as:

$$NR = \frac{R - R_{min}}{\Delta R}$$

where NR is normalized resistance and R is the actual or instantaneous resistance. The sensor response is normalized because they exhibit long-term drift in $R_0$ and $R_{min}$ (and therefore ΔR) but not in the shape of the curve. The sensors have been found to give a repeatable response when normalized according to equation (1) if $R_0$ and $R_{min}$ are obtained periodically. Normalization is particularly important for neural network implementation if it has to be used in the span of many days with single training.

Figure 17:
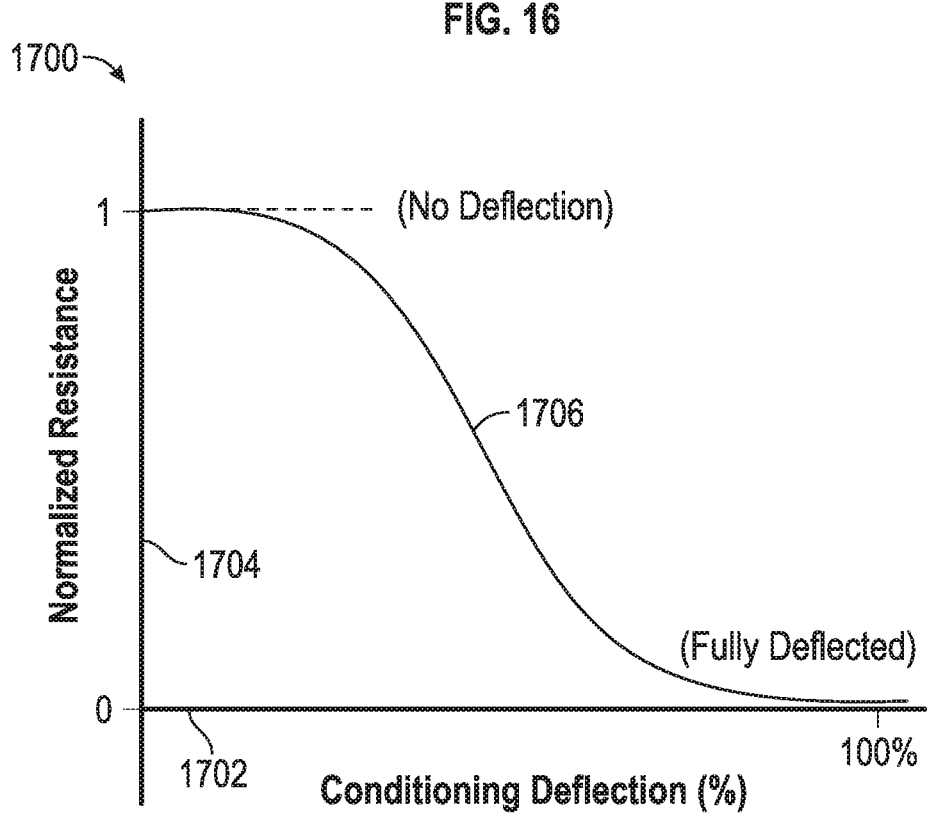
FIG. 17 shows the pattern in which the resistance changes with deflection.

A typical normalized response of the hair sensor is presented in FIG. 17.

FIG. 17 shows a graph 1700 with conditioning deflection (%) on x-axis 1702, and normalized resistance on y-axis 1704. The resistance is shown as line 1706.

If a non-normalized sensor response from one day is used to train the neural network and another non-normalized sensor response is used after a few days with the same neural network, the sensor response will be different due to long-term drift and the neural network will not be able to predict accurately.

The normalization assists in eliminating the long-term drift and avoids training of the neural network each time before using it. One of the main causes of heterogeneity is the differing length of the sensors.

The illustrated embodiment recognized the advantage of that by positioning the longer sensors towards the trailing edge of the wing. In other embodiments, sensors may be better screened or have better control over the manufacturing so sensors are of more uniform sensitivity and range.

As shown in FIG. 17, the pattern 1706 in which the resistance changes with deflection varies with the load application point or load profile on the hair shaft. Therefore, the shape of the normalized curve may differ from one sensor to another depending on the length of the sensor, load profile, and variation in the CNT growth process. However, all of the sensors have three regions: initial or low response region at low velocity or deflection, highly sensitive region at the middle, and low response region at high velocity or deflection. Although the sensor resistance usually decreases from deflection, in some cases the resistance may initially increase when deflected in a certain direction. This can be attributed to the omnidirectional properties of the sensor design. Eventually, enough deflection in any direction should begin to decrease the resistance of the sensor until saturation.

The hairs could be trimmed to have matching lengths, but instead the hairs were ordered by length since the boundary layer is expected to be larger towards the trailing edge as observed from the particle image velocimetry (PIV) and also predicted from XFOIL's boundary layer calculation for the NACA2410 airfoil used in this embodiment.

The Reynolds number, as shown in TABLE [[2]]1 was approximately between approximately 90000 to approximately 160000. This is close to the Reynolds number that bats fly and the bats use hair sensors to detect the flow. The boundary layer thickness at T1 and T10, estimated from XFOIL at angle of attacks of 0° and −11°, are in Table [[2]]1. The hair sensors were trimmed to use at low Reynolds number because it was expected the sensors to be sensitive at low wind speed and saturated at high wind speed.

TABLE 1

| $V_\infty$(mph) | $\alpha$(deg) | Reynolds Number | Boundary layer thickness (mm) | | Hair sensor length (mm) | |
|---|---|---|---|---|---|---|
| | | | T1 | T10 | T1 | T10 |
| 20 | −11 | 90000 | 0.8 | 1.3 | | |
| 20 | 0 | 90000 | 1.1 | 2. | | |
| 35 | −11 | 160000 | 0.6 | 0.95 | 1.656 | 2.272 |
| 35 | 0 | 160000 | 0.82 | 1.85 | | |

Figure 4A:
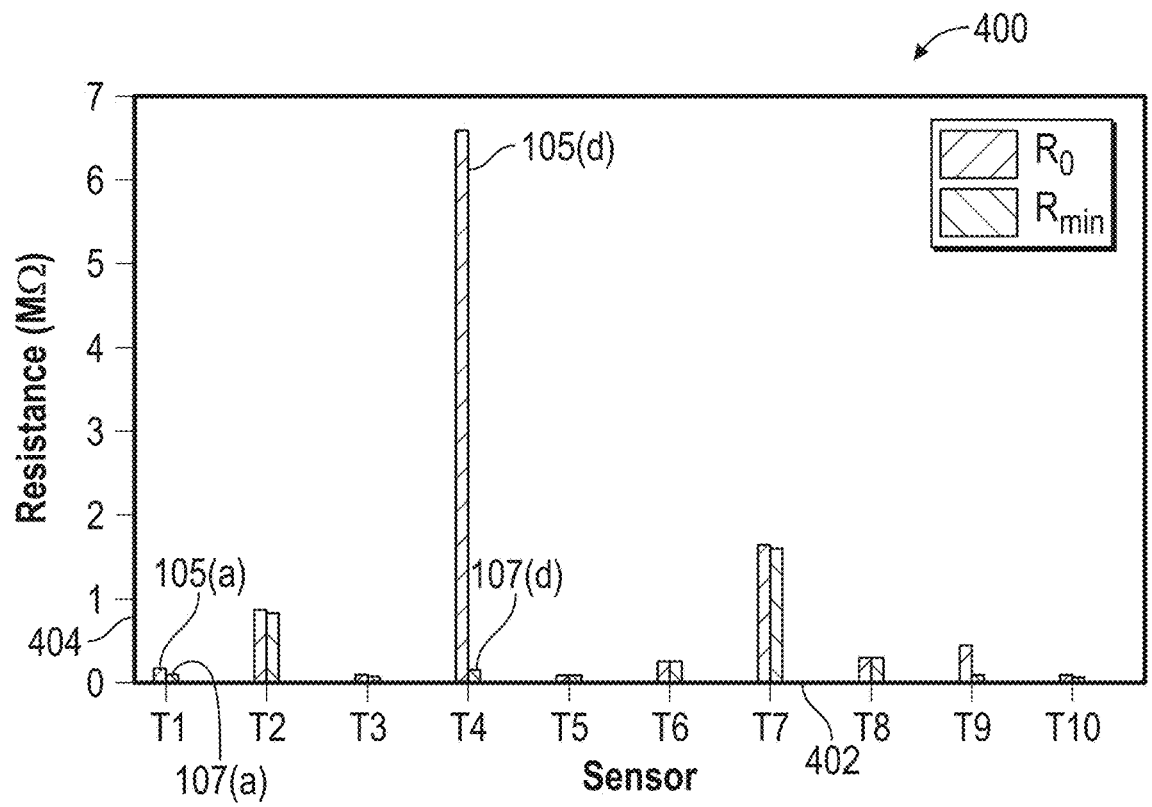
FIGS. 4A, 4B, 4C and 4D illustrate sensor characteristics $R_0$, $R_{min}$.
Figure 4B:
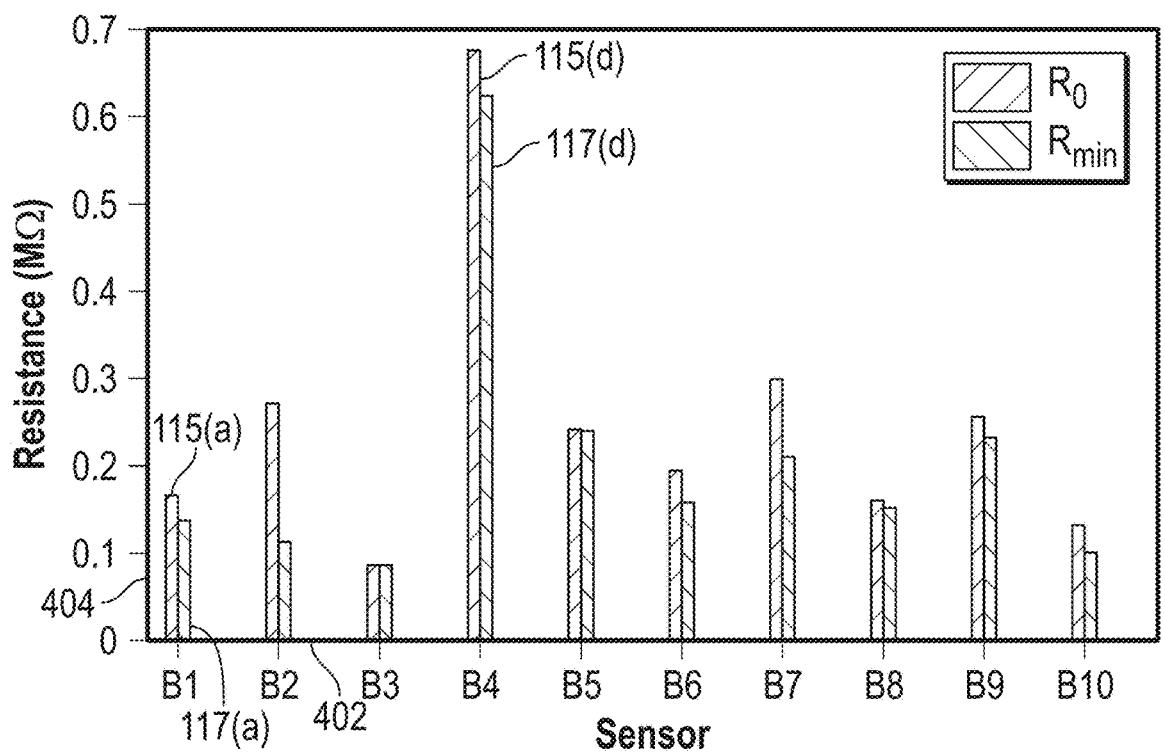

FIGS. 4A and 4B show the resistances ($R_0$, 105 $R_{min}$, 107) obtained from the point deflection calibration. As shown in FIG. 4A, X-axis 402 shows ten top (upper surface) sensors T1-T10. Y-axis 404 shows resistance. Each top sensor T1-T10 has a corresponding $R_0$, 105 and $R_{min}$, 107 plot. T1 has $R_0$, 105(a) and $R_{min}$, 107(a). The base resistance of the sensor is not predictable and it may vary from a few kΩ to a few MΩ based on the CNT growth process. On the other hand, the change in sensor resistance (ΔR) greatly varies with point of force application or load profile, hence differing from one scenario to another. The resistance change also varies from one sensor to another, for example, the change in resistance (ΔR) is ~1% for T8 whereas it is approximately 97% for T4 $R_0$, 105(d) and $R_{min}$, 107(d). Since the base characteristics of the sensors ($R_0$, $R_{min}$) may drift in time, the sensor characteristics can be initialized by gradually increasing and decreasing the wind velocity for a few cycles during the wind tunnel test.

FIG. 4B shows a similar plot for bottom sensors B1-B10. X-axis 402 shows ten bottom (lower surface) sensors B1-B10. Y-axis 404 shows resistance. Each bottom sensor B1-B10 has a corresponding $R_0$, 115 and $R_{min}$, 117 plot. B1 has $R_0$, 115(a) and $R_{min}$, 117(a). B4 has $R_0$, 115(d) and $R_{min}$, 117(d). Similar to the top sensors, the base resistance of the sensor is not predictable and it may vary from a few kΩ to a few MΩ based on the CNT growth process. On the other hand, the change in sensor resistance (ΔR) greatly varies with point of force application or load profile, hence differing from one scenario to another. The resistance change also varies from one sensor to another.

Figure 4C:
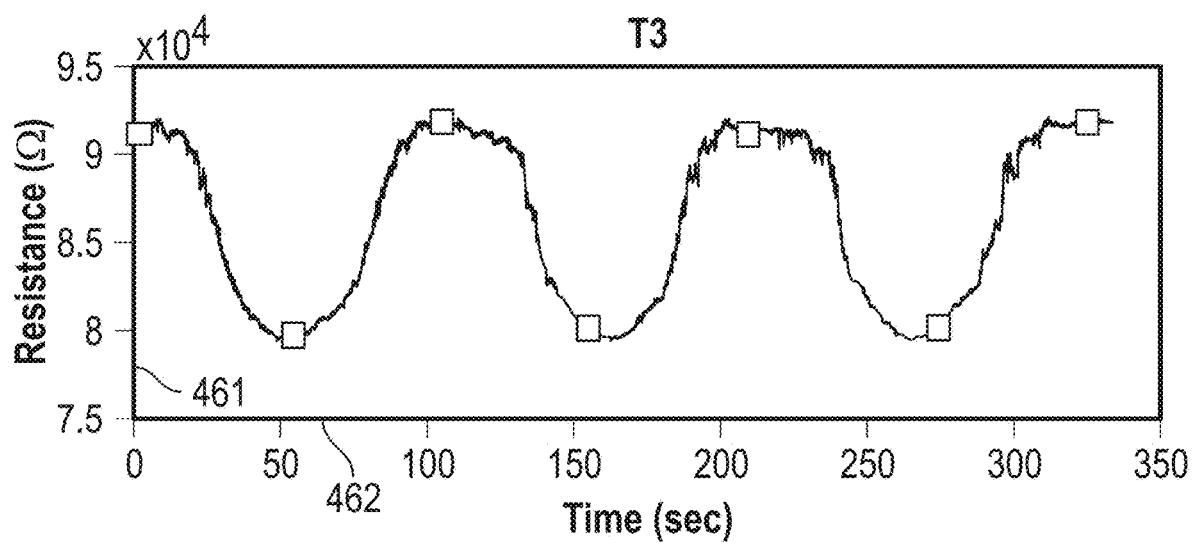

FIG. 4C shows the response of T3, plotted on X-axis 462 of time and the Y-axis 461 of resistance. Sensor T3 was sensitive on all operating velocities for the embodiment, at an angle of attack of −11° for the initialization test.

Figure 4D:
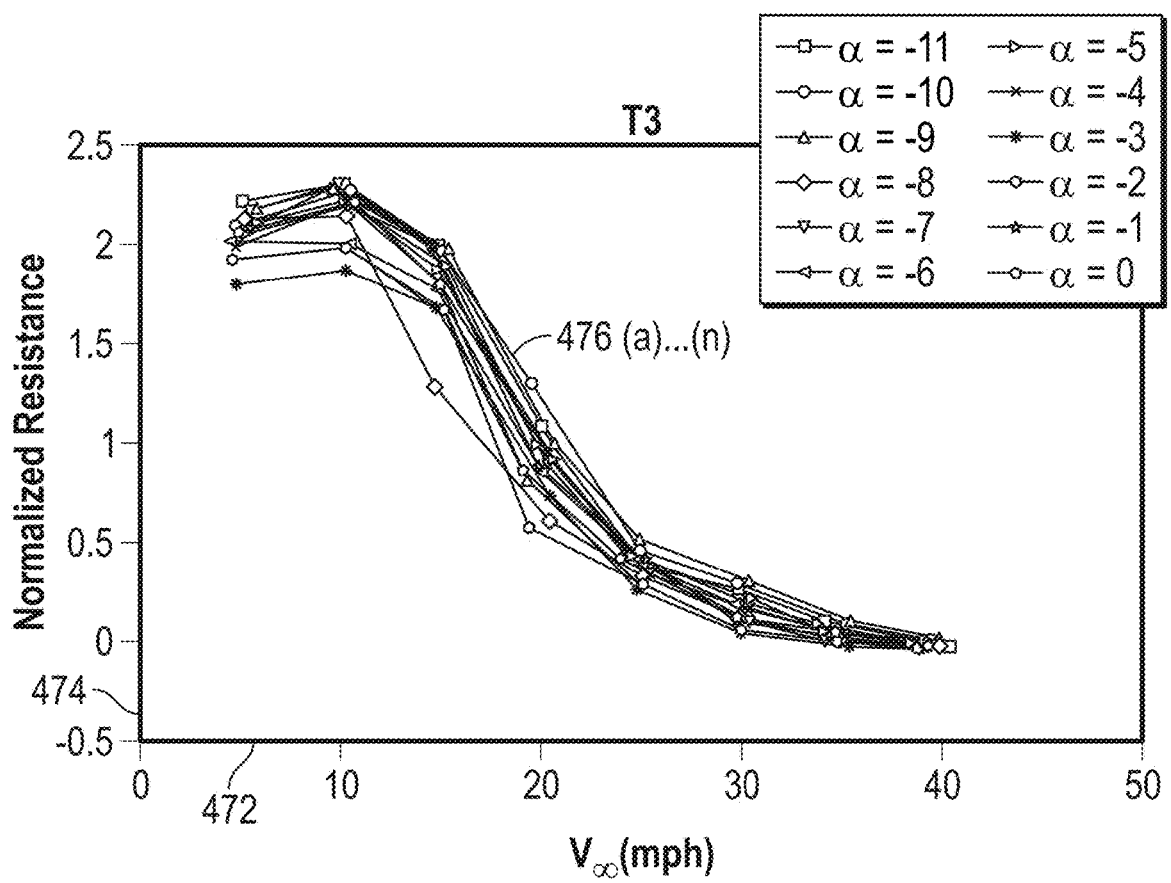

FIG. 4D shows velocity in mph on X-axis 472 and normalized resistance on Y-axis 474 with plot 476, which includes the characteristics resistance ($R_0$, $R_{min}$) of T3 were obtained by averaging corresponding peak and valley resistances.

For example, a normalized curve for sensor T3, based on the initialized resistance, is shown in FIG. 4D. Sensor T3 was chosen because it was sensitive in the wide velocity range. Since the sensor was not completely saturated and/or the minimum resistance was not reached during initialization, the normalized resistance is larger than 1 at the low velocity region and negative at the high velocity region. The normalized resistance obtained outside the [0, 1] range is solely due to the choice of normalization parameters ($R_0$, $R_{min}$ and ΔR) and is not an indication of the deficiency in the sensor.

NI9236 strain gauge modules with quarter bridge configuration were used to record the resistance from the sensor arrays. Each hair sensor terminal was connected with a 350Ω precision resistor in parallel to comply with the 350Ω resistors used by the NI9236 bridge module. An AERO-LAB® Educational Wind Tunnel was used for the wind tunnel experiment. It is an open circuit wind tunnel having a 12"×12"×24" test section and operating wind speed range of approximately 10 mph-145 mph. This wind tunnel setup allowed measurements of force, moment, angle of attack, and free-stream velocity to be recorded at discrete points.

Figure 5A:
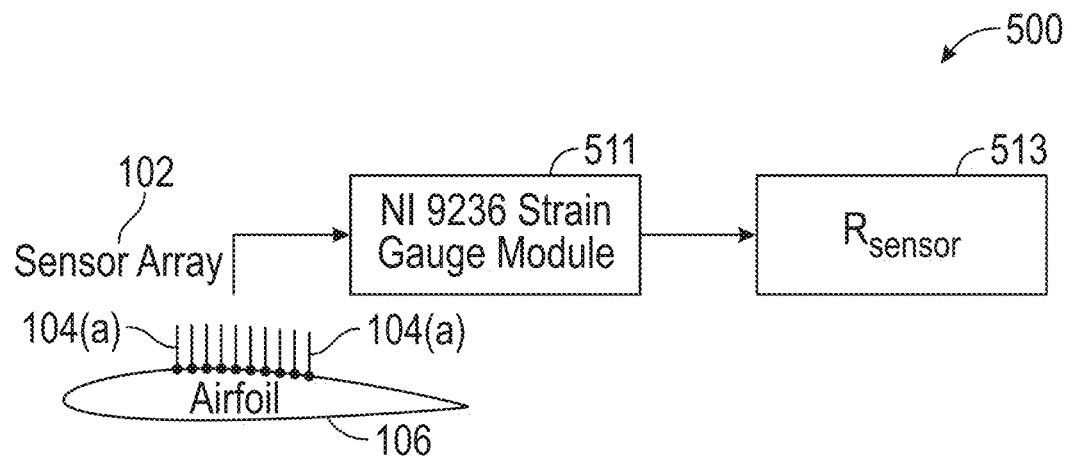
FIGS. 5A, 5B and 5C illustrate data acquisition (DAQ) and wind tunnel setup.

FIG. 5A shows a diagram 500 of an airfoil surface 106 having a plurality of sensors 104(a) . . . (n), where "n" is any suitable number, which form an artificial hair sensor array 102. The sensor array (AHS) 102 is coupled to the strain gauge module 511, with precision resistor 513 in parallel with the AHS. The airfoil surface 106 is an installation of the NACA2410 wing section.

Figure 5B:
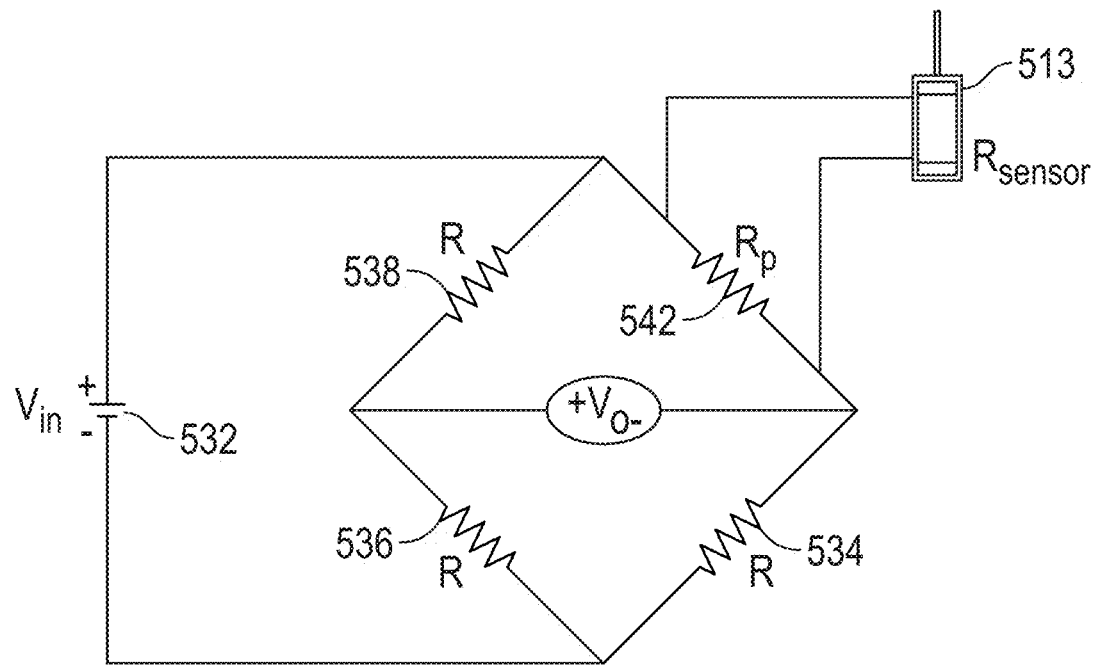

FIG. 5B shows a schematic with voltage source 523, bridge circuit with resistors 534, 536, 538 and 542. The bridge circuit is coupled to resistor 513. The conductive traces on the surface connect the hair sensors of the plurality of hair sensors to a corresponding plurality of bridge circuits. Each of the hair sensors are connected in parallel to resistance R in a bridge of the corresponding bridge circuit of the plurality of bridge circuits.

Figure 5C:
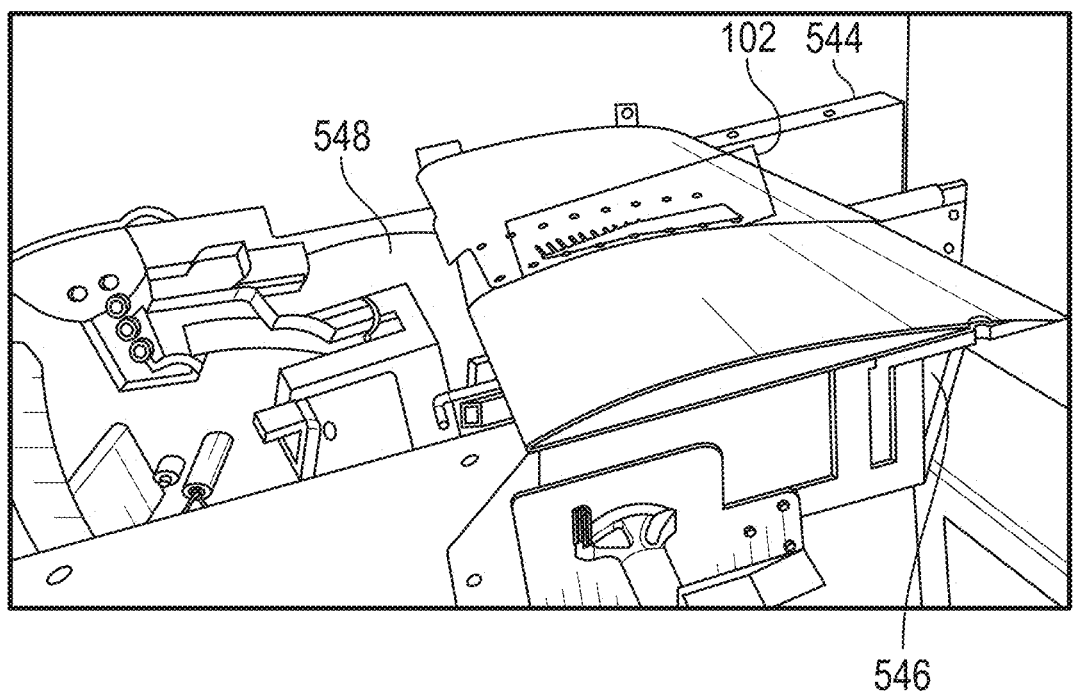

FIG. 5C shows a test set-up with top sensor array 102, load cell 544, pitch control 546 and sensor wires 548 (generally) from senor 102 to NI9326 gauge.

Several tests were run with a different angle of attack (α) (from −11° to 11° with an increment of 0.5°) and different wind velocities ($V_\infty$) (from 5 mph to 40 mph with an increment of 5 mph). The angle of attack was fixed at one value and the free-stream velocity was gradually increased while stopping for approximately 10 seconds at the velocity measurement points. Angle of attack (α), free-stream velocity ($V_\infty$), lift, drag, and moments were recorded at these discrete test points. However, the sensor resistance was collected continuously at a rate of 1000 samples/second at a particular angle of attack while the free-stream velocity was gradually increased.

FIGS. 6A, 6B, 6C and 6D show the raw data obtained from the selected hair sensors at both positive and negative angle of attacks while changing the wind velocity from approximately 0 to approximately 40 mph.

Figure 6A:
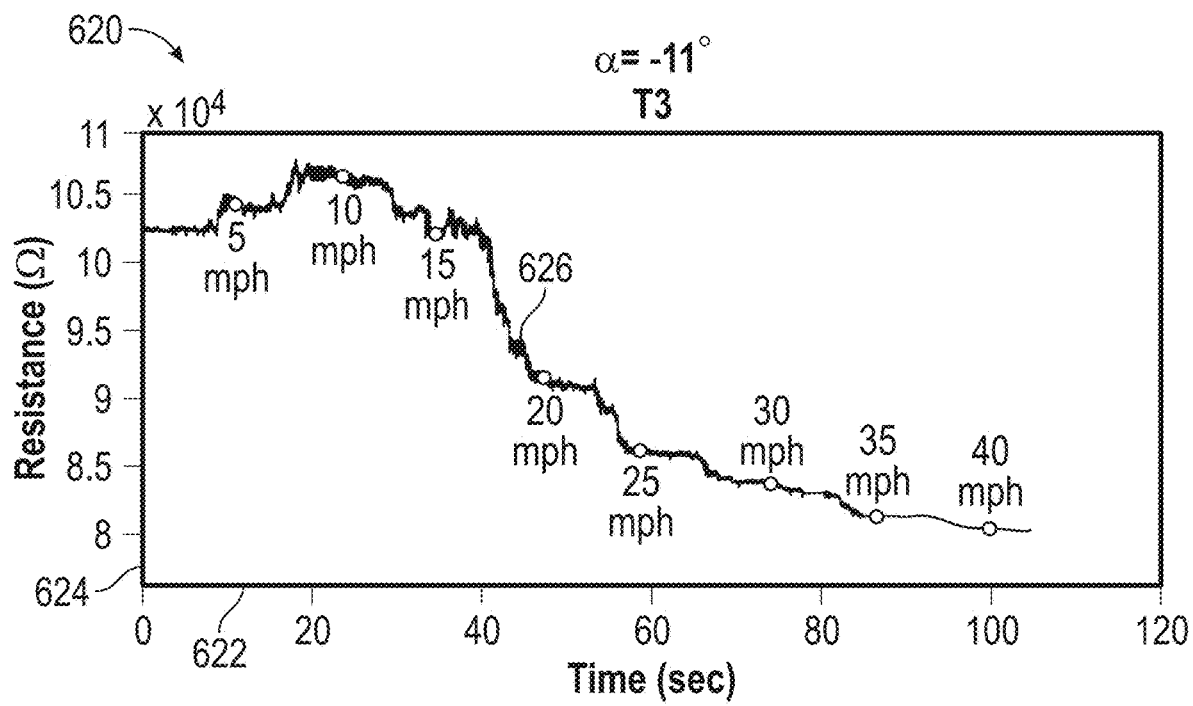
FIGS. 6A, 6B, 6C and 6D illustrates sensor responses with changing wind speed.

FIG. 6A shows plot 626 on graph 620 having X-axis, time (seconds) 622 and Y-axis resistance (ohms) 624.

Figure 6B:
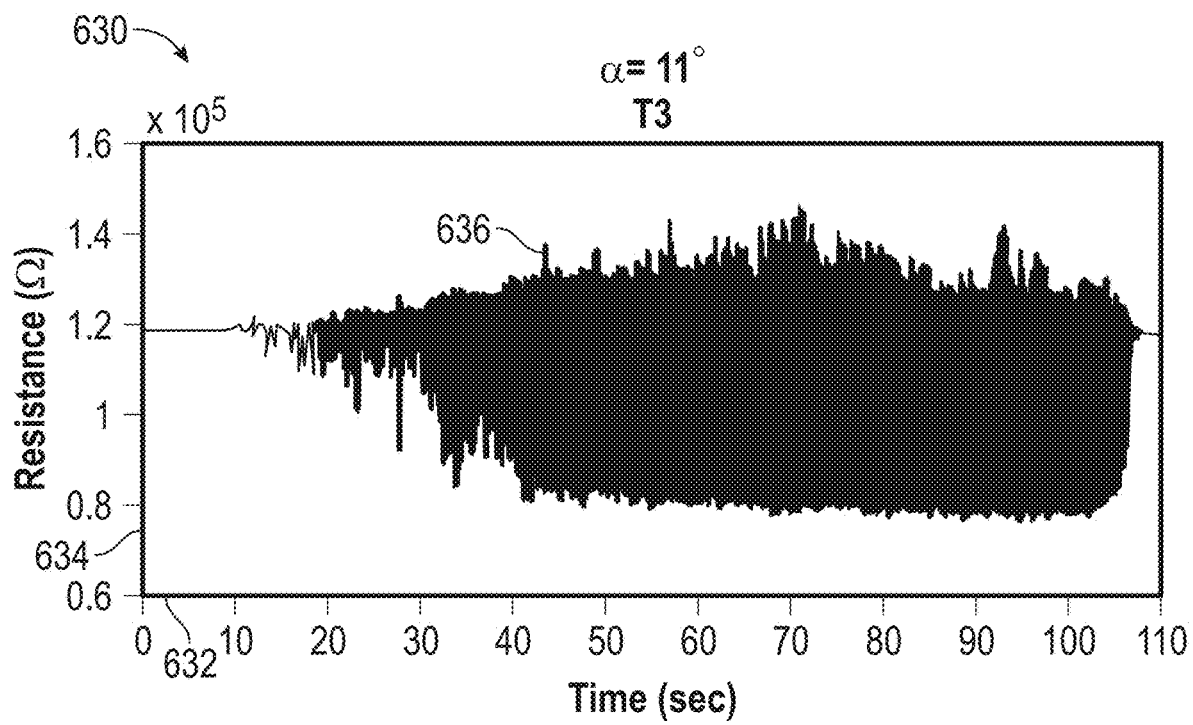

FIG. 6B shows plot 636 on graph 630 having X-axis, time (seconds) 632 and Y-axis resistance (ohms) 634.

Figure 6C:
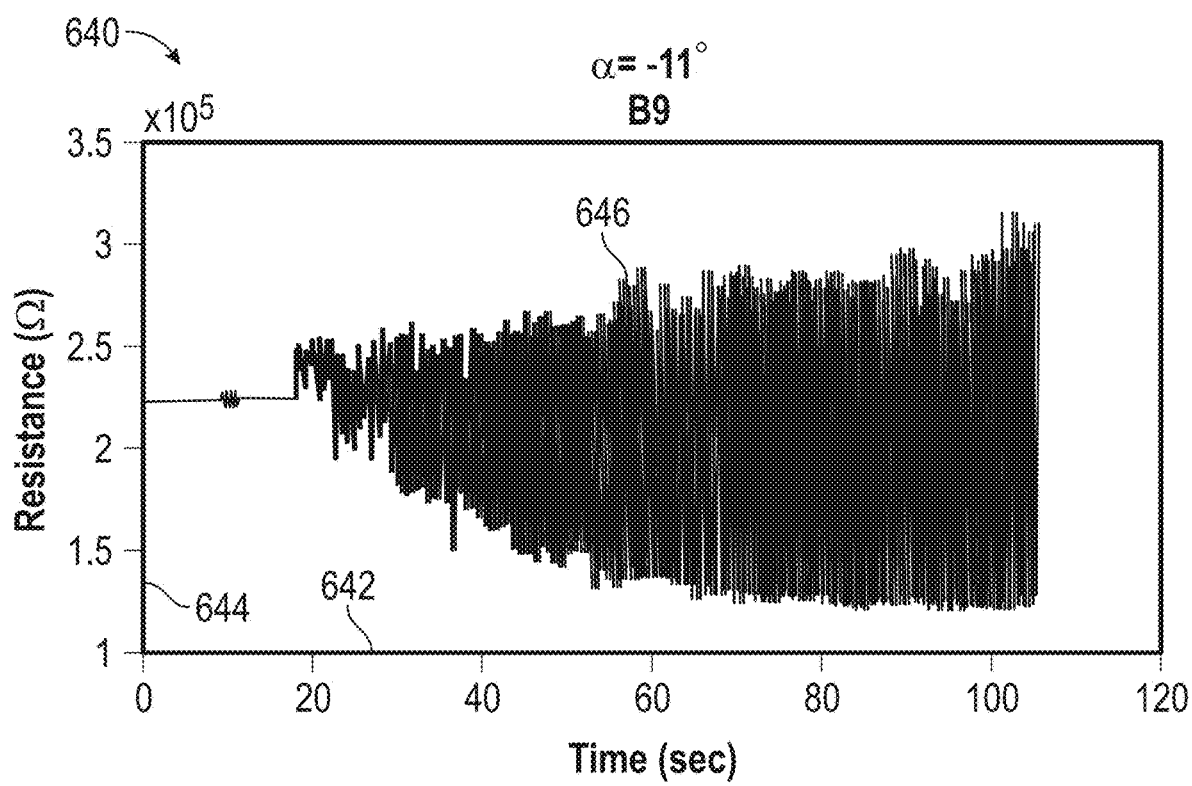

FIG. 6C shows plot 646 on graph 640 having X-axis, time (seconds) 642 and Y-axis resistance (ohms) 644.

Figure 6D:
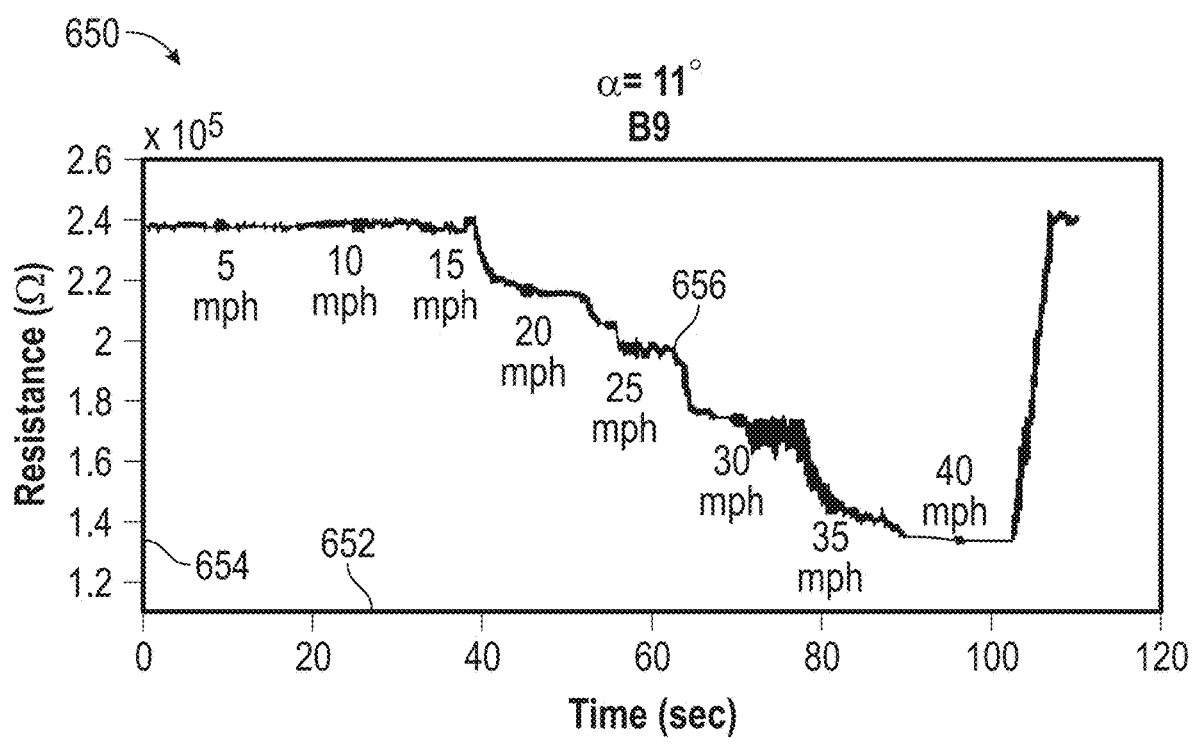

FIG. 6D shows plot 656 on graph 650 having X-axis, time (seconds) 652 and Y-axis resistance (ohms) 654.

The plot indicates the instances of constant velocity stops as labeled. The top surface of airfoil has a thin and attached boundary layer at a negative angle of attack which is observed as a smooth change in the resistance of the sensor on the top surface when velocity is increased. For example, FIG. 6A shows the response 626 of sensor T3 with a change in free-stream velocity when $\alpha=-11°$. On the other hand, the flow separates and becomes turbulent at the bottom surface of the airfoil at negative angles of attack resulting in the vibration of the sensors. Such a vibration is visible in the response 646 of the sensor B9 at $\alpha=-11°$ in FIG. 6C.

A similar trend is seen when angle of attacks are positive with sensors on the bottom surface showing a smooth response and those on the top showing a vibrating response. For example, sensor T3 shows a vibrating response (FIG. 6B) and B9 shows a smooth response (FIG. 6D) when $\alpha=11°$. The large flat region at the start of the B9 in FIG. 6D indicates that its sensitivity is low at low wind speed. From FIG. 6A and also from the sensor data at other angles of attack (not shown here), it was observed that the sensor array on the top surface and bottom surface of the airfoil show the smooth response for $\alpha \in (-11°, 3°)$ and for $\alpha \in (0°, 11°)$ respectively. The vibrating sensor response does not produce useful information to train the neural network or to predict the aerodynamic parameters, hence only negative angles of attack and the top sensor array were considered.

Because of their size, weight, cost, and integrability, AHS can be used as distributed sensors to obtain temporal and spatial surface flow information. This flow information can further be used to derive other aerodynamic quantities such as pressure distribution, stagnation and separation points, and aerodynamic forces and moments. The response obtained from the distributed AHS array may be enhanced from its raw, or unprocessed form, by processing, or manipulation.

For example, aerodynamic force, moments, and stagnation and separation points can be used for gust alleviation and flutter suppression, but the local flow response obtained from the distributed array of AHS does not directly give these quantities. Because of the nature and numbers of sensors used and the complexity of the parameter to be observed from the sensor response, a neural network may be used to process the AHS data because of their ability to handle complex problems when trained properly.

A feed-forward neural network may be used to predict the aerodynamic parameters such as angle of attack, free-stream velocity, lift coefficient, and moment coefficient using AHS measurement of local velocity. The AHS senses the local flow information such as local flow velocity, shear stress, pressure, etc. The local flow phenomenon is a complex process and varies with the body immersed on the fluid and flow conditions. The raw data obtained from the AHS is resistance change corresponding to local flow features. The neural network may be a three layered feed forward neural network. A first and second layer of the neural network are configured to use a hyperbolic tangent activation function and the third layer is configured to use a linear activation function.

The first and second layers of the neural network use 15 neurons. The number of neurons in the third layer is equal to a number of outputs corresponding to the estimated aerodynamic parameters.

Since the neural network is being used to predict the aerodynamic parameters, the input of the neural network does not necessarily have to be the local velocity or shear stress. The resistance change produced by the AHS can directly be used with the neural network to predict the aerodynamic characteristics listed above. Therefore, the resistance values obtained from the AHS array were directly used with the illustrated embodiments.

Also, the flow features vary from one point to another on the surface of the airfoil for the same flow condition such as angle of attack and free-stream velocity. The neural network approximates the function that relates these local measurements to the aerodynamic parameters during training. The spatially distributed hair sensors not only provide more measurements and hence more data but also provide distinct spatial local flow information for a particular flow condition.

Using spatially distributed information increases the accuracy in neural network training and prediction. At the same time, the longer hair towards the trailing edge ensures the tip of the hair remains outside of the boundary layer. In the illustrated embodiments, the leading edge was not considered for the sensor integration because it was observed from simulation that having a sensor at the leading edge loses this distinctiveness in measurement. The trailing edge was avoided due to the presence of trailing edge flap.

Two feed-forward neural networks each having three layers were chosen, one to predict the lift and moment coefficient, and another to predict angle of attack and free-stream velocity. Ten AHS measurements from the top AHS array were used as inputs to the neural networks. Fifteen hidden neurons having a hyperbolic tangent activation function were used for each hidden layer. A linear activation function is used for neurons at the output layer. Each neural network has 437 weights and biases.

Figure 7:
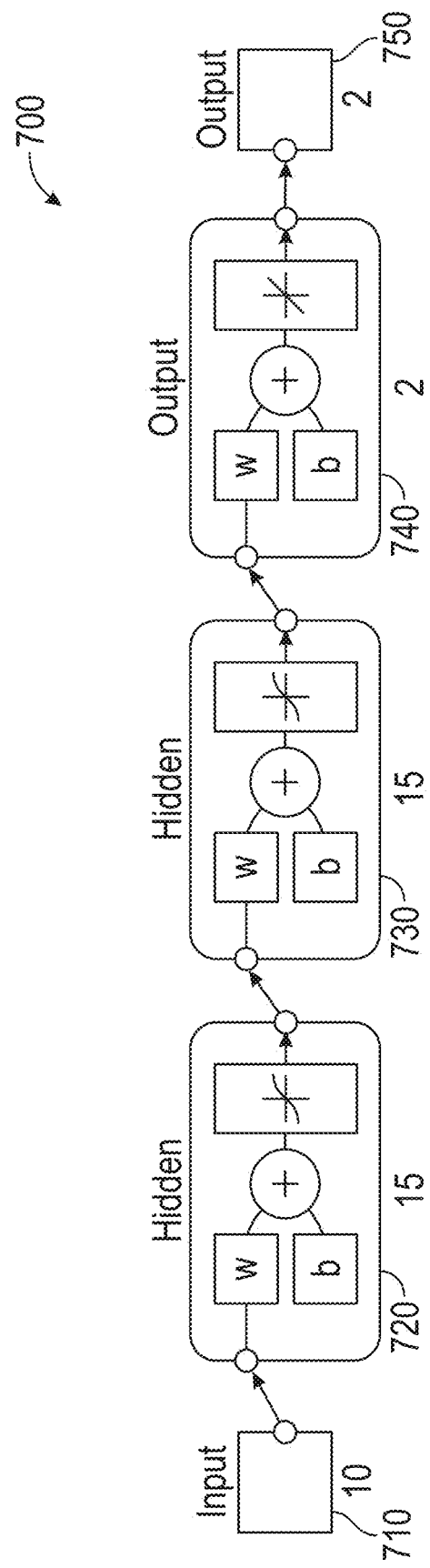
FIG. 7 is a schematic representation of a three-layered feed-forward neural network architecture.

FIG. 7 shows a schematic 700 of the architecture of the 10-15-15-2 neural network used in an embodiment. Input 710 provides sensed data gathered from one or more hair sensors. This sensed input is provided to a first neural network 720, and the output from 720 is provided to neural network 730. The output from neural network 730 is provided to neural network 740, which provides output 750. This output is a real-time representation of the signal, which signal may be a time-varying signal.

From a neural network perspective, this is a function approximation relating the change in sensor resistance due to local flow condition to the angle of attack, free-stream velocity, lift coefficient, and moment coefficient.

The neural network training process is an optimization technique to find the optimum values of weights and biases that represent the desired function when combined with the corresponding activation functions. Since the carbon nanotube (CNT) growth process adds some variability in the sensor response and other measurement errors are introduced from the wind tunnel, the neural network training algorithm has to be robust enough to take these factors into account. A Bayesian regularization algorithm is used to train the neural network because of its robustness and ability to handle data with error. MATLAB®'s neural network toolbox was used to design and train the neural network.

The wind tunnel load balance has a large error because comparatively little lift was generated on the wing model at the low velocity region. On the other hand, most of the sensors were saturated at the high velocity region (40 mph). Hence, the velocity points of 20, 25, 30 and 35 mph were considered for neural network training and testing.

The time series of the resistance data were first normalized based on $R_0$ and $R_{min}$ obtained from a sensor initialization test at the wind tunnel as set forth above. The normalized resistance values were averaged for 2 seconds at each velocity measurement point and angle of attack between approximately −10.5° to approximately −0.5° with a step of approximately 0.5° to generate neural network input test data set. Corresponding force, moments, angle of attack, and free-stream velocity were used as the test target data set for the neural network.

Table 2 shows the test data sets for the neural network. Only results for the sensors on top of the airfoil model at negative angles of attack are used to demonstrate the utility of the hair sensors. For positive angles of attack, the hair sensors on the bottom of the model could be used. For relatively small angles of attack, sensors on both top and bottom could be used.

TABLE 2

| Sensor | $V_\infty$ (mph) | α (deg) |
|---|---|---|
| T1, T2, T3, . . . T10 | 20, 25, 30, 35 | −10.5, −10, −9.5, . . . −0.5 |

NN Input: 84 data points with two seconds of averaged normalized resistance values at these data points for each sensor
NN Output: lift and moment coefficient, angle of attack and free-stream velocity at discrete α and $V_\infty$ points Although the sensor resistances were captured continuously, the force and moments data were saved at discrete wind velocities and angle of attack points. A total of 92 data points were obtained from the combination of four velocities (approximately 20, approximately 25, approximately 30, approximately 35 mph) and 23 angle of attack points)(−11°: 0.5°:0°. The total number of data points (92) were limited compared to the total weights and biases (437) on the neural network. Also, constant velocity could not be achieved for approximately 10 seconds of the interval as desired during force measurement.

One way to take these factors into account is to increase the number of training data points. To achieve this, an interval of five seconds around each velocity measurement point was considered in sensor measurement data. This interval was divided into ten equal sub intervals of 0.5 seconds each. The normalized resistances were averaged in these sub-intervals increasing the total number of data points by a factor of ten. These sub intervals increase the total amount of resistance data, but the force, moment, angle of attack, and free-stream velocity were the same for all data within the sub interval. In other words, all the resistance data at that particular sub interval corresponds to the same force, moment, angle of attack, and free-stream velocity.

Since sensor resistance values vary around each velocity measurement point as seen in FIG. 6A, incorporating sub-interval data in the training set helps the neural network to consider this variability. Smaller sub-intervals (0.25 seconds each), resulting in even more data points, were also iterated, however, these did not change the prediction result significantly. Table 3 shows the summary of training data sets.

TABLE 3

| Sensor | $V_\infty$ (mph) | α (deg) |
|---|---|---|
| T1, T2, T3, . . . T10 | 20, 25, 30, 35 | −11, −10.5, −9, . . . −0.5, 0 |

NN Input: 920 data points with 0.5 seconds of averaged normalized resistance values discrete α and $V_\infty$ points
NN target output: lift and moment coefficient, angle of attack and free-stream velocity at discrete α and $V_\infty$ points The inherent characteristics of each sensor, e.g., base resistance ($R_0$), minimum resistance ($R_{min}$), and normalized resistance curve are different from each other due to variability in CNT morphology because of the growth process. The lengths of the sensors were also different from sensor to sensor, which introduces more variability due to difference in exposed hair length on the flow.

Figure 8:
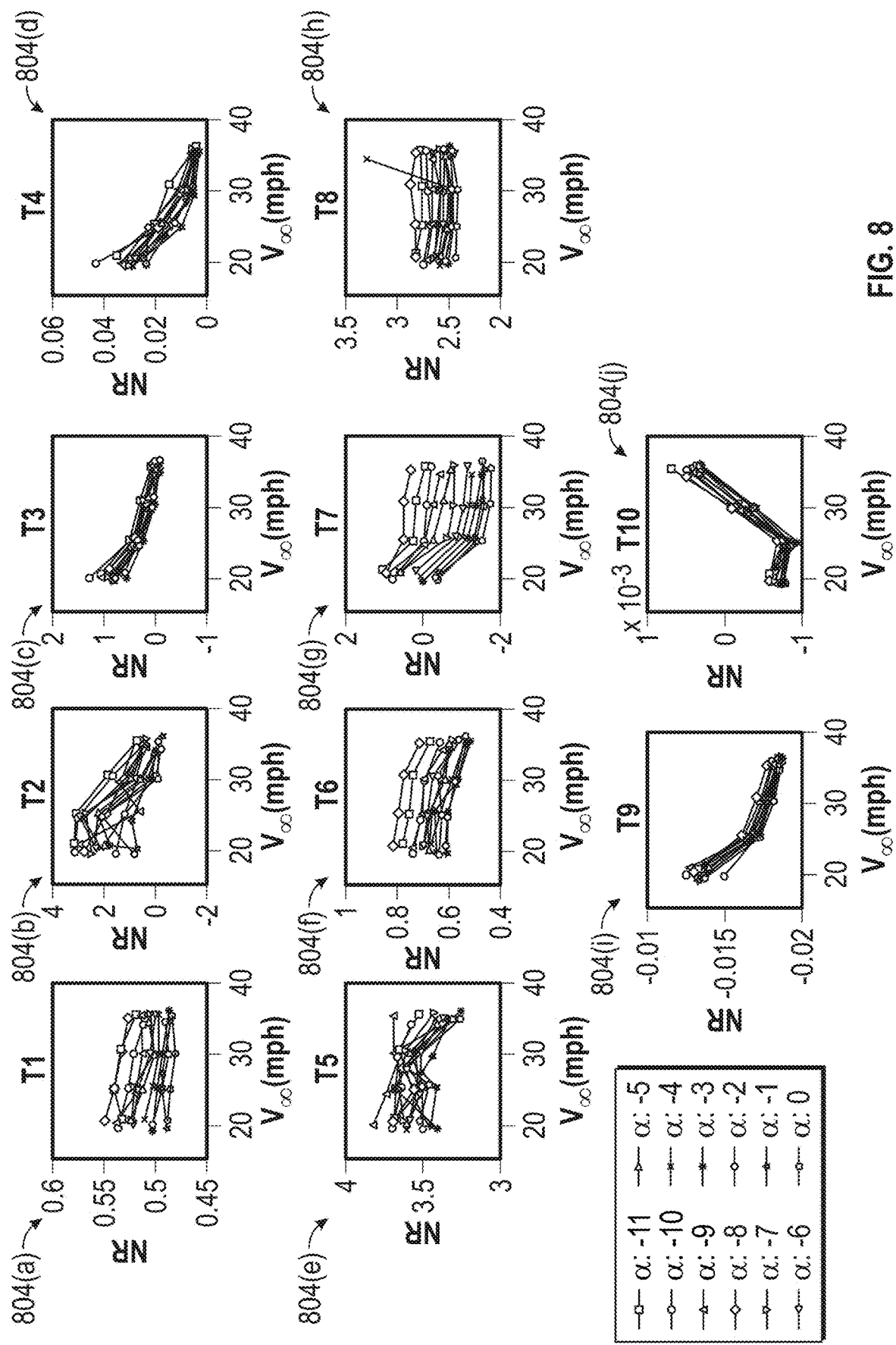
FIG. 8 illustrates normalized resistance of the top sensors T1-T10, with respect to wind velocity at a negative angle of attack.

FIG. 8 shows ten graphs 804(a) . . . (j) that show the normalized resistance of the top sensor array sensors T1-T10, respectively, in the velocity range used for the neural network training. The variability can easily be observed from this figure, e.g., sensors T8 (graph 804(h)), T9 (graph 804(i)), and T10 (graph 804(j)), are saturated and show very small change (note that the scale on each normalized curve is different). Also, some variability can be seen for sensors T1 (graph 804(a)), T2 (graph 804(b)), and T5 (graph 804(e)). From XFOIL simulation it was found that the local velocity at the top of the airfoil increases with change in angle of attack from −11° to 0°.

Also, PIV measurement data also showed a similar trend. Therefore, the hairs on the top array are determined to deflect more when the angle of attack increases from −11° to 0°, resulting in further CNT compression and additional decrease in resistance. The normalized resistance curve should shift down as the angle of attack increases from −11° to 0°. All the sensors except T10 (graph 804(j)) show this general trend. Many sensors show one or two outlying angle of attack curves that may lie in the unexpected regions.

Figure 9:
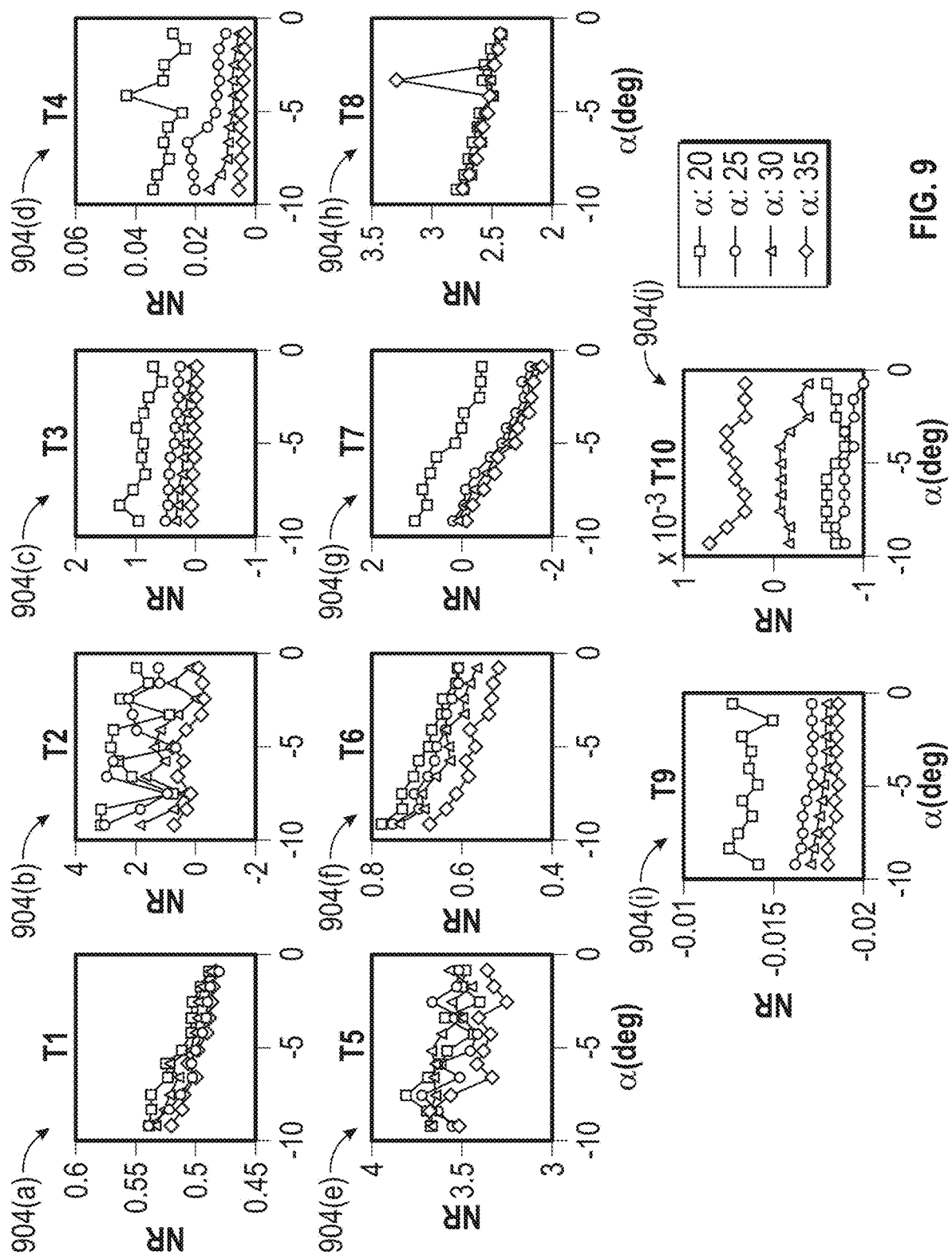
FIG. 9 illustrates normalized sensor response with respect to the angle of attack for sensors T1-T10, respectively.
Figure 10A:
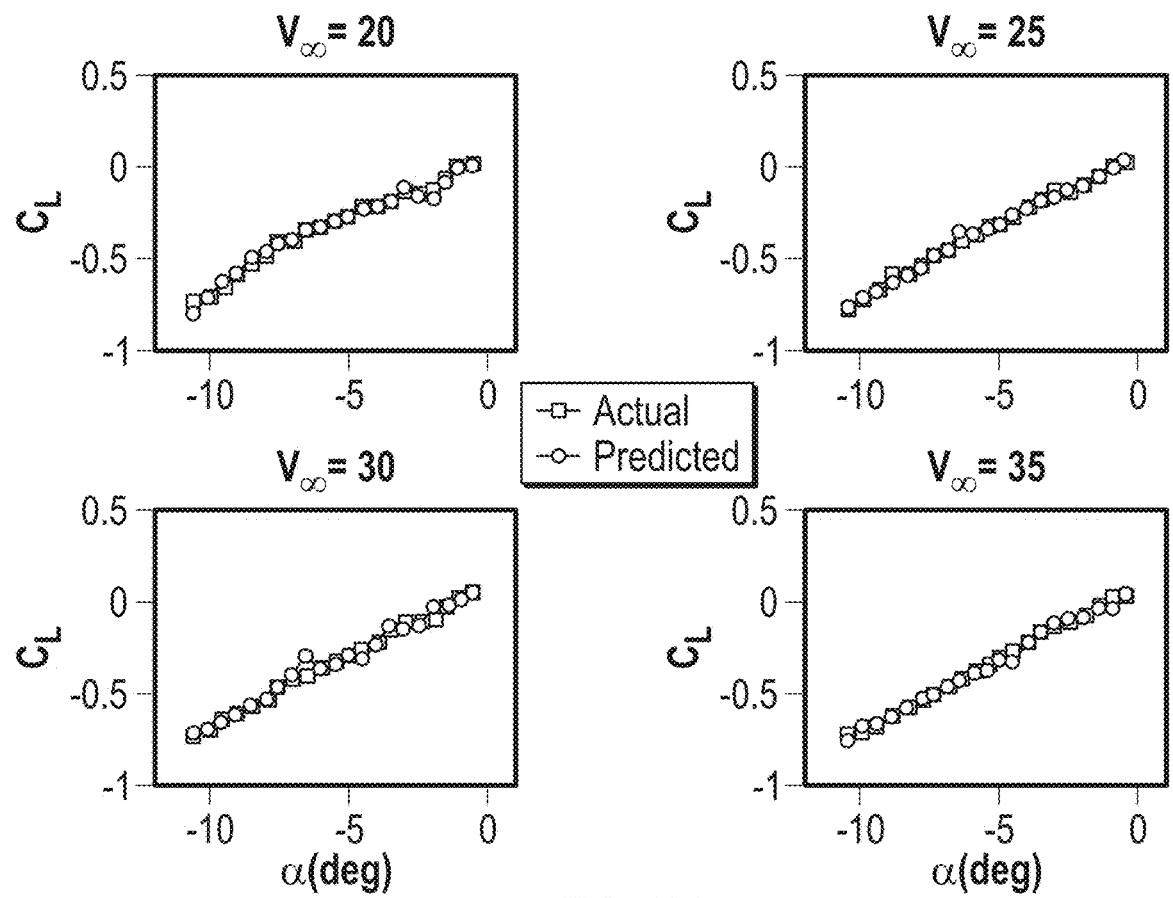
FIGS. 10A, 10B, 10C and 10D illustrate neural network prediction of aerodynamic parameters with a single neural network.
Figure 10B:
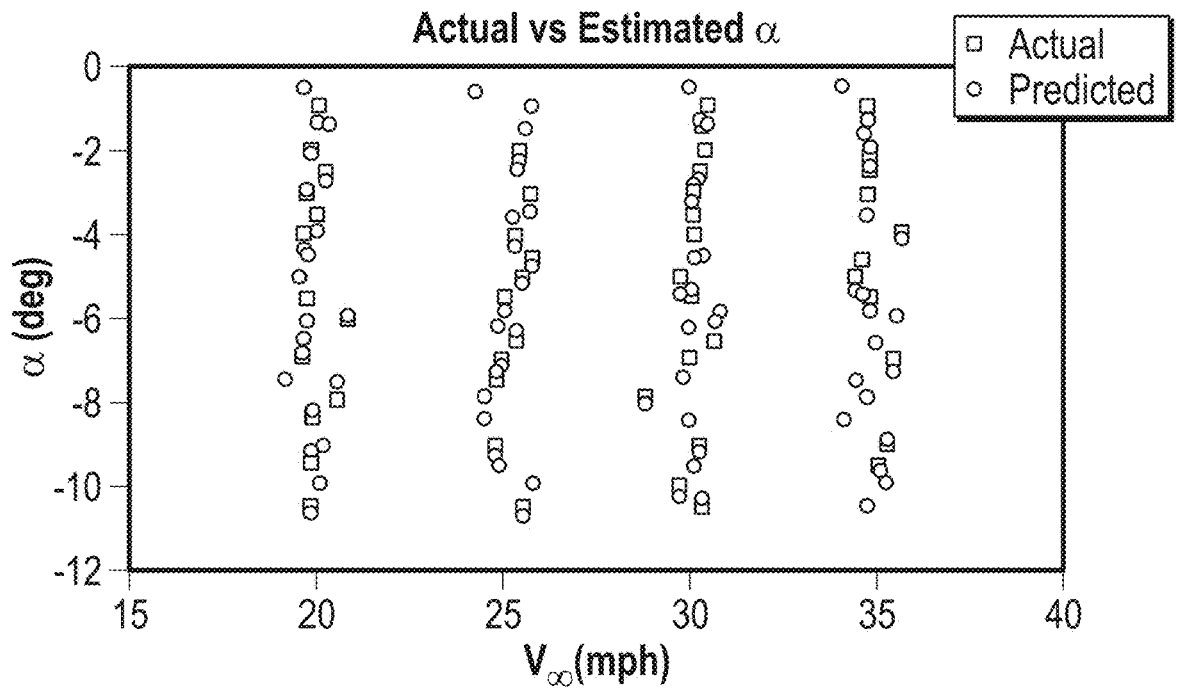
Figure 10C:
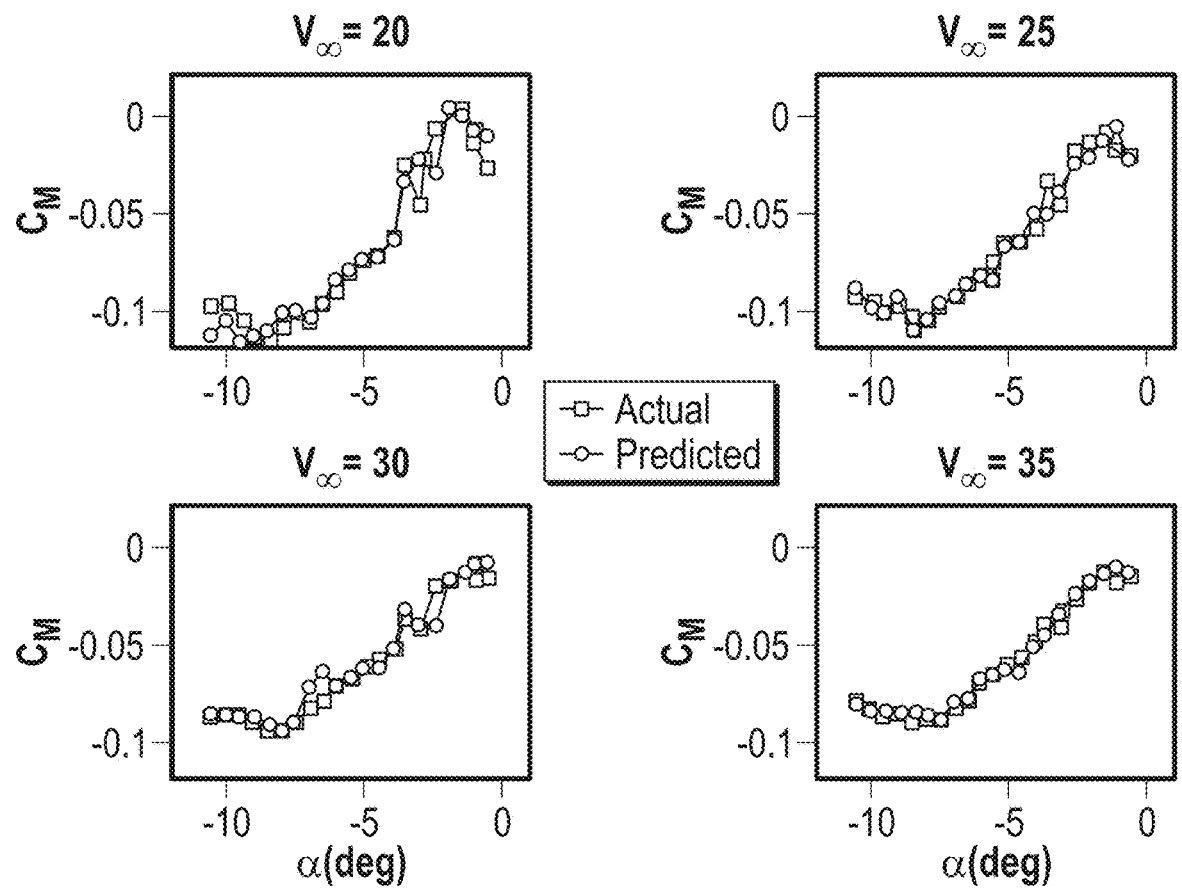
Figure 10D:
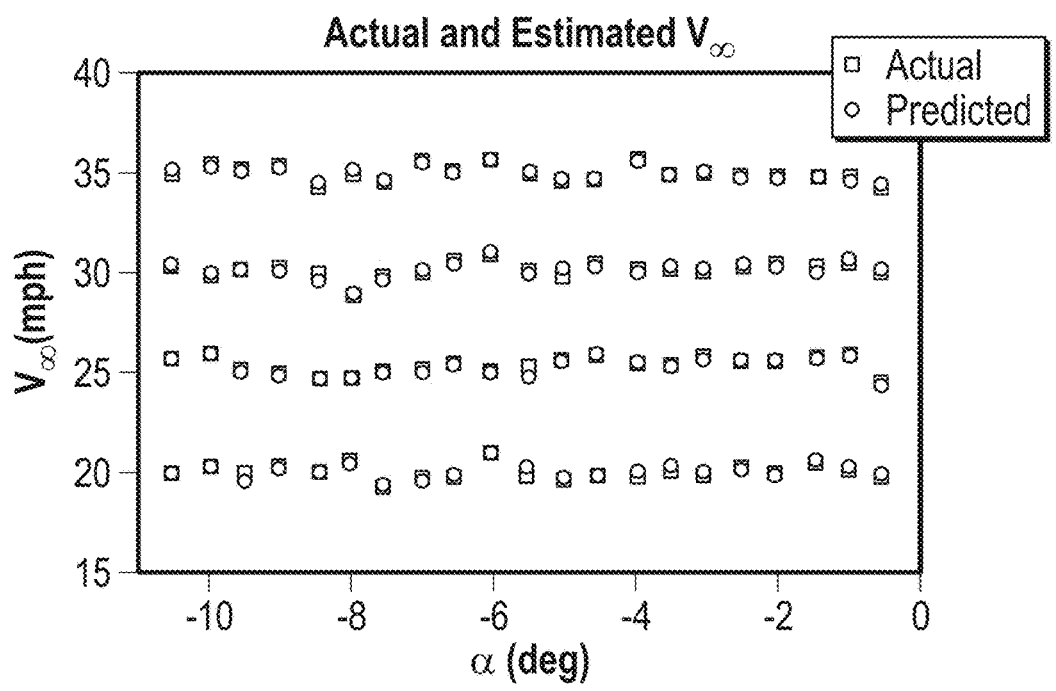
Figure 11E:
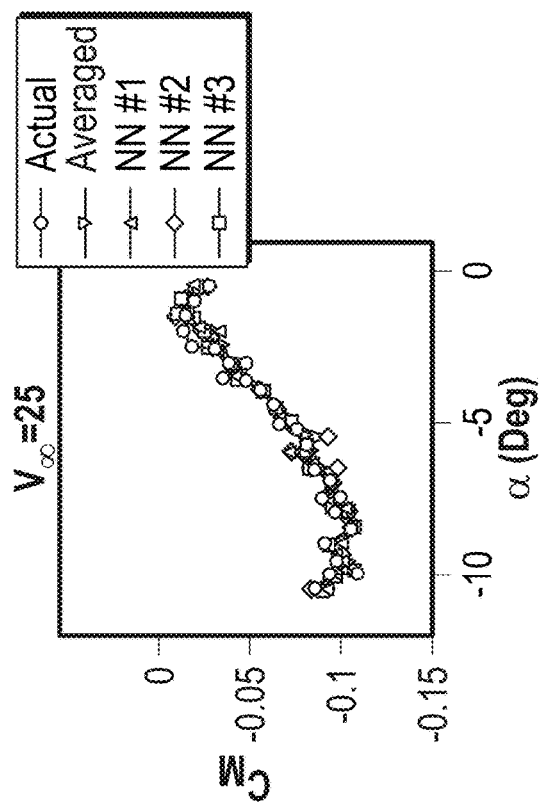
Figure 11F:
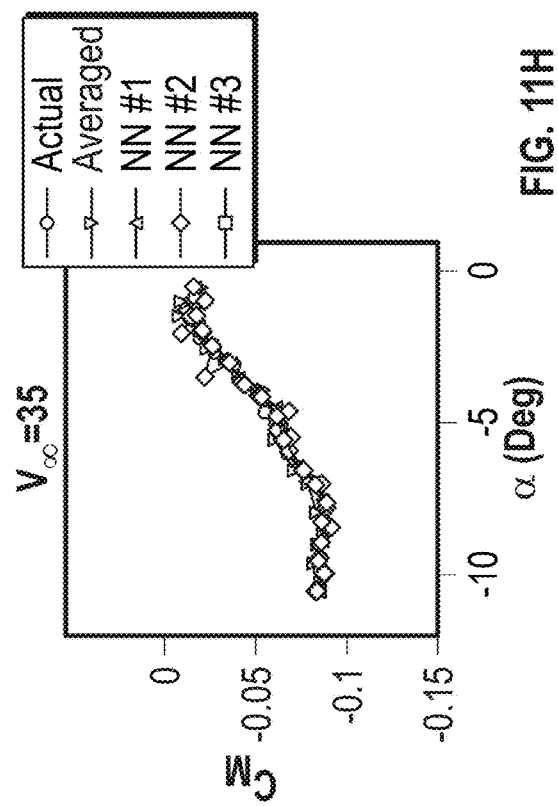
Figure 11G:
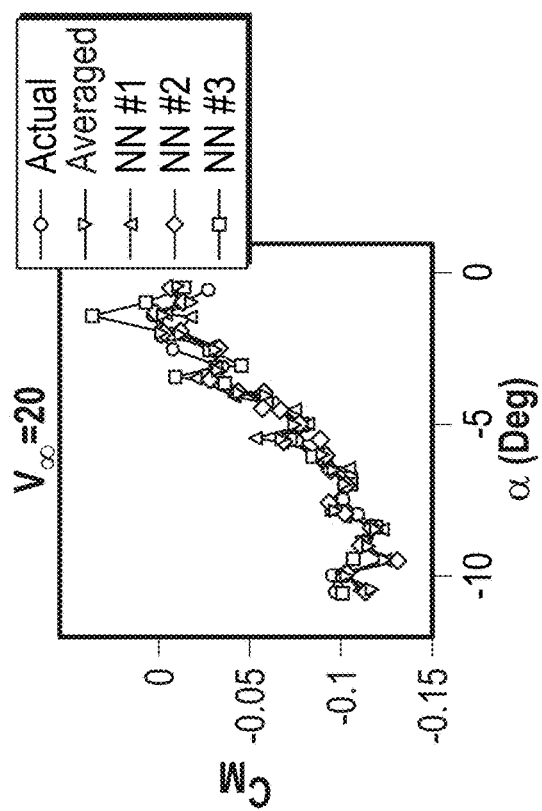
Figure 11H:
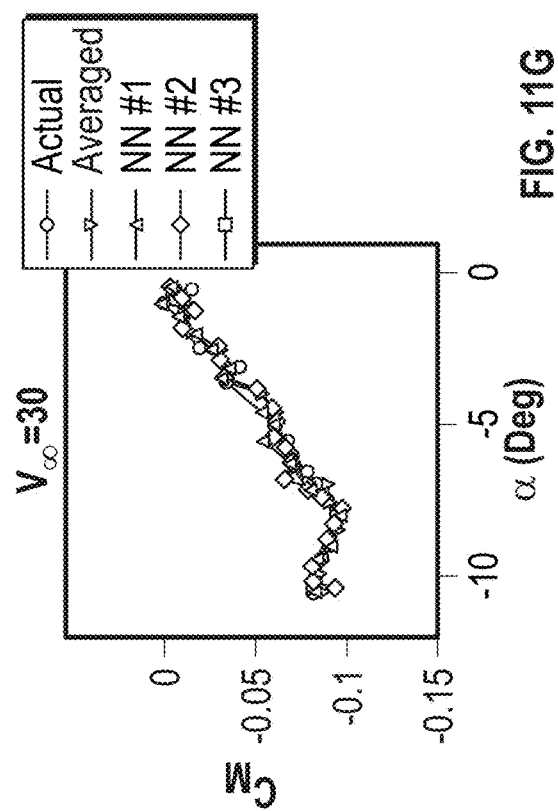
Figure 12A:
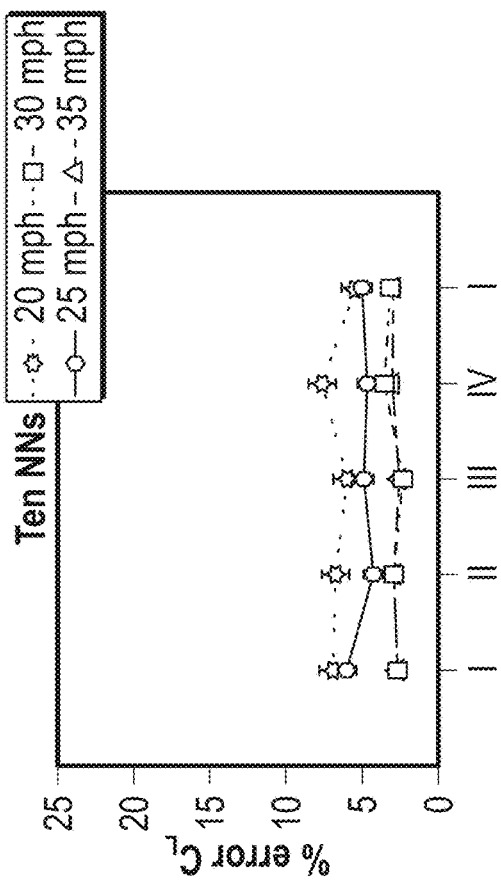
FIGS. 12A, 12B, 12C and 12D illustrate variations in prediction error with one neural network (one NN) and ten averaged neural networks (ten NNs).
Figure 12B:
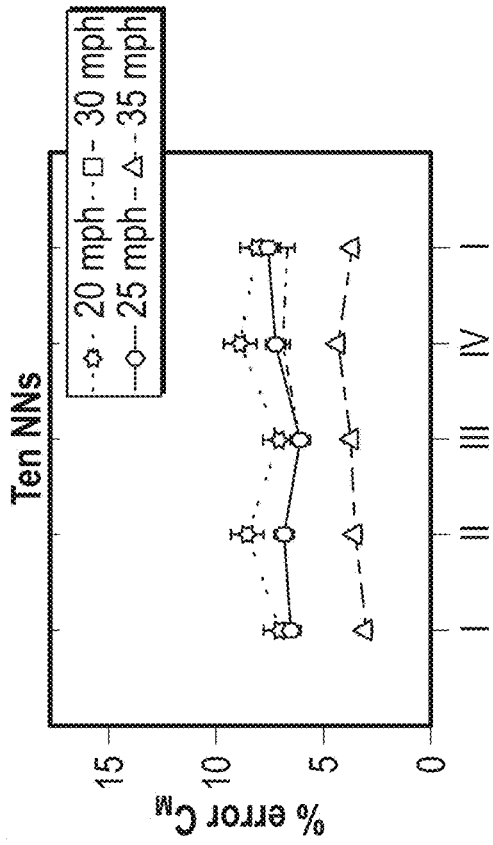
Figure 12C:
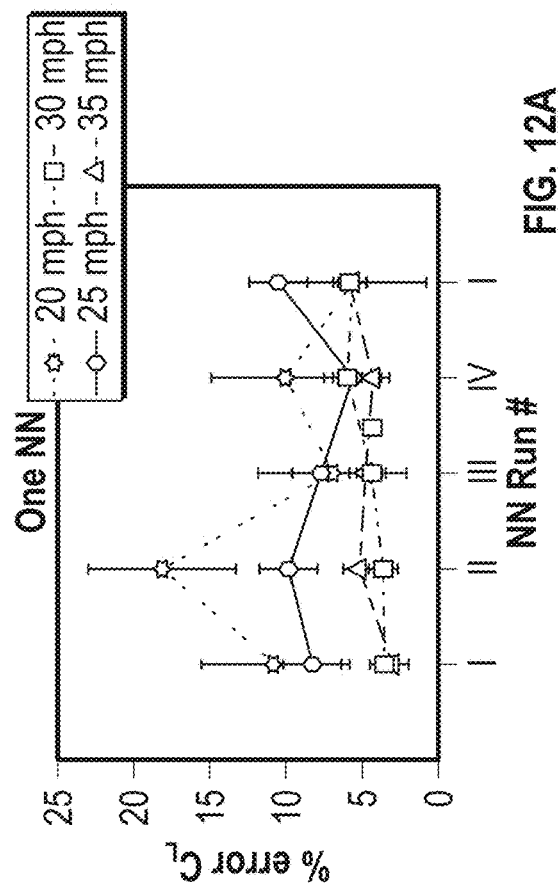
Figure 12D:
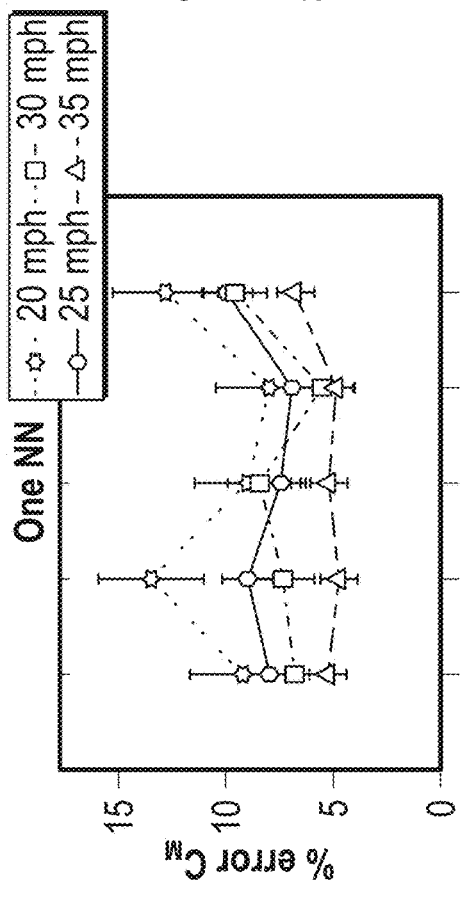

FIG. 9 shows ten graphs 904(a) . . . (j) showing the sensor response with change in the angle of attack. The response of the sensors (normalized resistance) with respect to angle of attack change was investigated to assess the quality of sensors to resolve the angle of attack change. The normalized resistance for all sensors shows a similar pattern with resistance decreasing with an increase in velocity except T10 (graph 904(j)). An outlier measurement can be observed for T8 (graph 904(h)) at −4° angle of attack and wind velocity of 35 mph, which might be a bad measurement or sensor drift at that particular case. The slope of the normalized curve is small for many sensors.

Sensors T1 (graph 904(a)), T2 (graph 904(b)), and T5 (graph 904(e)) show comparatively large variability, a similar pattern when plotted against free-stream velocity as seen in FIG. 8. The sensitivity of each sensor with the angle of attack is found to be low compared to that with velocity.

In order to reduce the complexity and number of data required for the neural network training, two different neural networks were used to predict the lift and moment coefficient pair, and angle of attack and free-stream velocity pair. Both neural networks have three layers with 15 neurons on the hidden layer with a hyperbolic tangent activation function. The convergence value of mean squared error (MSE) for the network to predict lift and moment coefficient pair was set to 0.0001.

The MSE convergence value was set to approximately 0.0125 for the network to predict angle of attack and free-stream velocity since it was the minimum value that could be achieved. The weights and biases are initialized randomly and the training data were normalized to be in the range of [−1, 1].

FIGS. 10A-D show the results of the neural network prediction of different aerodynamic parameters. The lift coefficient, moment coefficient and free-stream velocity prediction are close to the actual values, however, prediction error is comparatively large for angle of attack prediction. This large prediction error in angle of attack is due to the low sensitivity of the hair sensors to change in the angle of attack for a fixed velocity.

The neural network prediction is different for different training runs due to randomized initialization of the weights and biases combined with the complex optimization space. The main reason behind this variation is the complexity of the mean squared error surface used for optimization during neural network training and the error in sensor measurement due to noise. The weights and biases can be initialized at fixed points, however, it is impossible to choose the ideal fixed initialization point because of the large number of weights and biases involved. To assess the effect of randomized weights and biases initialization, ten separate neural networks with different initializations were used for prediction. The result is shown in FIGS. 11A-H.

The prediction variability is high for the approximately 20 mph wind speed region because of comparatively large force and moment measurement error at low velocity. It can be observed that the prediction for the same neural network is relatively accurate at some points and has high error at other points. For example, the NN #6 has high error at −4° and −2° points at $V_\infty$=35 mph band (FIG. 11D). Also, a neural network underpredicts at a point whereas another neural network overpredicts at the same point (e.g. FIG. 11A prediction at −5.5° at the $V_\infty$=20 mph band). Besides force measurement error and sensor variability, prediction error also arises from a small number of effective data compared to total weight and biases.

One way to reduce the prediction error due to random weight and bias initialization is to average the prediction of multiple neural networks. To illustrate this, five different predictions were observed with one and ten neural networks with random initialization of weights and biases on each prediction.

FIGS. 12A-D show the prediction and standard deviation error bars for each prediction of five unique neural network solutions on the same data. Ideally the prediction should be the same for each test; however, there is large variability when using only one neural network. The variability as well as the error reduces significantly when the responses of ten neural networks are averaged.

This can also be seen from FIGS. 11A-H where averaging neural network outputs, especially at points where some neural networks are underpredicting and others are overpredicting, reduces the prediction variability by a large extent. For the rest of the results shown in this section, the prediction results consist of the averaged response of ten neural networks in order to have consistent and low error prediction.

The individual sensors were divided into three categories based on their normalized resistance curve and prediction error when used to predict CL and CM individually. Although there was not a huge difference in performance of each sensor, sensors T3, T7, T8 had relatively low error in prediction whereas sensors T2, T9, T10 had relatively high prediction error. Sensors T1, T4, T5, T6 had error in between these two groups of sensors.

The neural networks were trained and tested with varying number of sensors to study the effect of the number of sensors on aerodynamic parameter prediction. Nine different cases of neural network with a different number of sensors were used to predict the lift and moment coefficients.

Table 4 summarizes these cases. The first two cases consist of relatively better sensors. Then average sensors are gradually added in cases Finally, relatively bad sensors are added in cases VI-IX.

TABLE 4

| CASE | SENSORS | EPOCH | ERROR THRESHOLD |
| --- | --- | --- | --- |
| I | T7, T8 | 1000 | 0.0025 |
| II | T3, T7, T8 | 1000 | 0.0003 |
| III | T2, T3, T7, T8 | 857 | 0.0001 |
| IV | T2, T3, T7, T8, T9 | 559 | 0.0001 |
| V | T2, T3, T7, T8, T9, T10 | 321 | 0.0001 |
| VI | T1, T2, T3, T7, T8, T9, T10 | 179 | 0.0001 |
| VII | T1, T2, T3, T4, T7, T8, T9, T10 | 153 | 0.0001 |
| VIII | T1, T2, T3, T4, T5, T7, T8, T9, T10 | 108 | 0.0001 |
| IX | T1, T2, T3, T4, T5, T6, T7, T8, T9, T10 | 111 | 0.0001 |

The neural network did not converge to the designated error threshold of 0.0001 within maximum specified epochs of 1000 for case I and case II. The neural network converged to the error threshold but the number of epochs taken to converge reduced as the number of sensors was increased. The sensors T7, T8, and T3 were chosen to start with because they were grouped as good sensors based on their individual performance.

The prediction errors for each case of Table 4 are shown in FIGS. 12A-D. The prediction error is quite large for case I, this is mainly due to insufficient measurements (number of sensors) used to approximate the function that relates aerodynamic coefficient to local flow. The error reduced significantly when three sensors are used in case II. Since the neural network convergence threshold of approximately 0.0001 could not be reached for this case, the prediction error is still larger than the other cases with more sensors. Although the training error threshold of approximately 0.0001 is reached, the prediction error does not decrease significantly when T2, T9, T10 were added.

However, the error decreases when more sensors are added as indicated by case VIII and case IX. From this observation, it can be concluded that the variability or inaccuracy of each sensor does not affect the overall performance when used as distributed arrays. Also, each sensor has different sensitivity and response due to differences in CNT morphology and these differences do not affect the overall response when used as distributed arrays.

Distributed arrays of the hair sensor have inherent robustness and adding more sensors improves the accuracy. Moreover, each sensor provides a unique local flow information based on their spatial position. More spatially distributed flow information are obtained as the number of sensors are increased. Since the neural network uses measurement from each sensor as spatially distributed flow feature pertaining to a particular set of aerodynamic parameters being predicted, having more features increases the prediction accuracy as observed in FIGS. 13A-B.

Figure 13A:
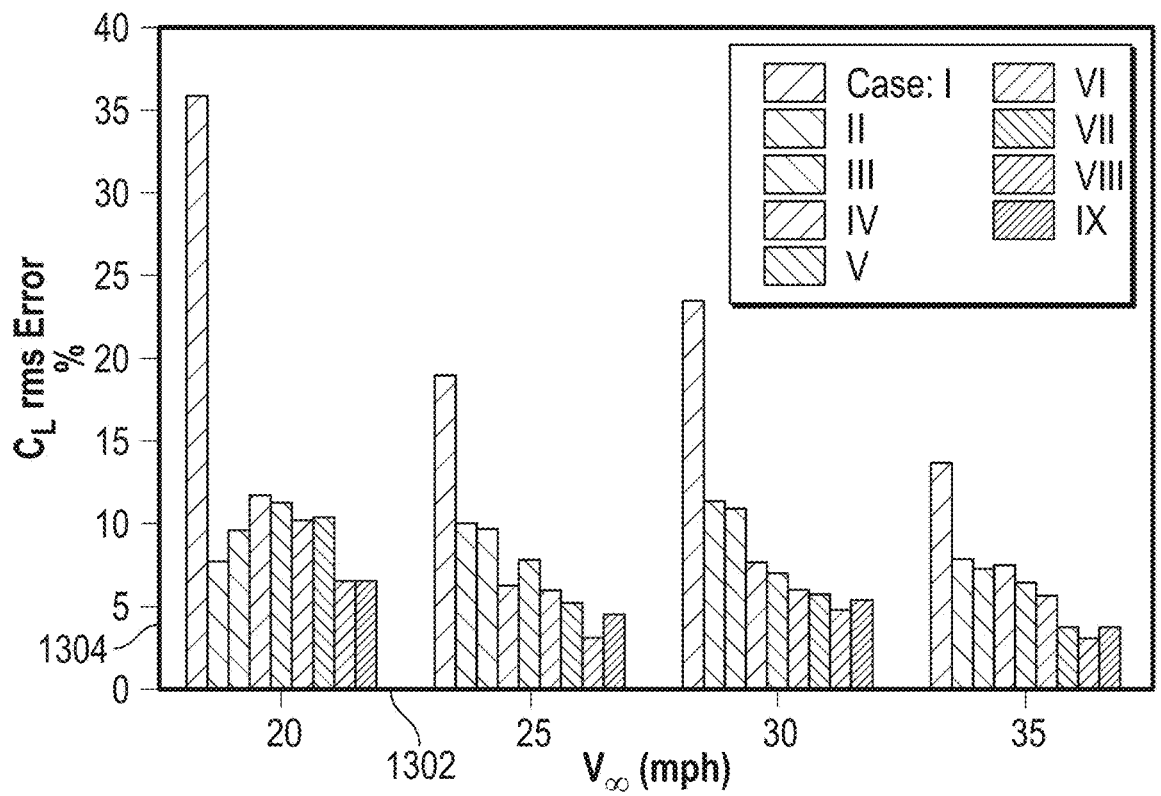
FIGS. 13A and 13B illustrate effects of change in the number of sensors.
Figure 13B:
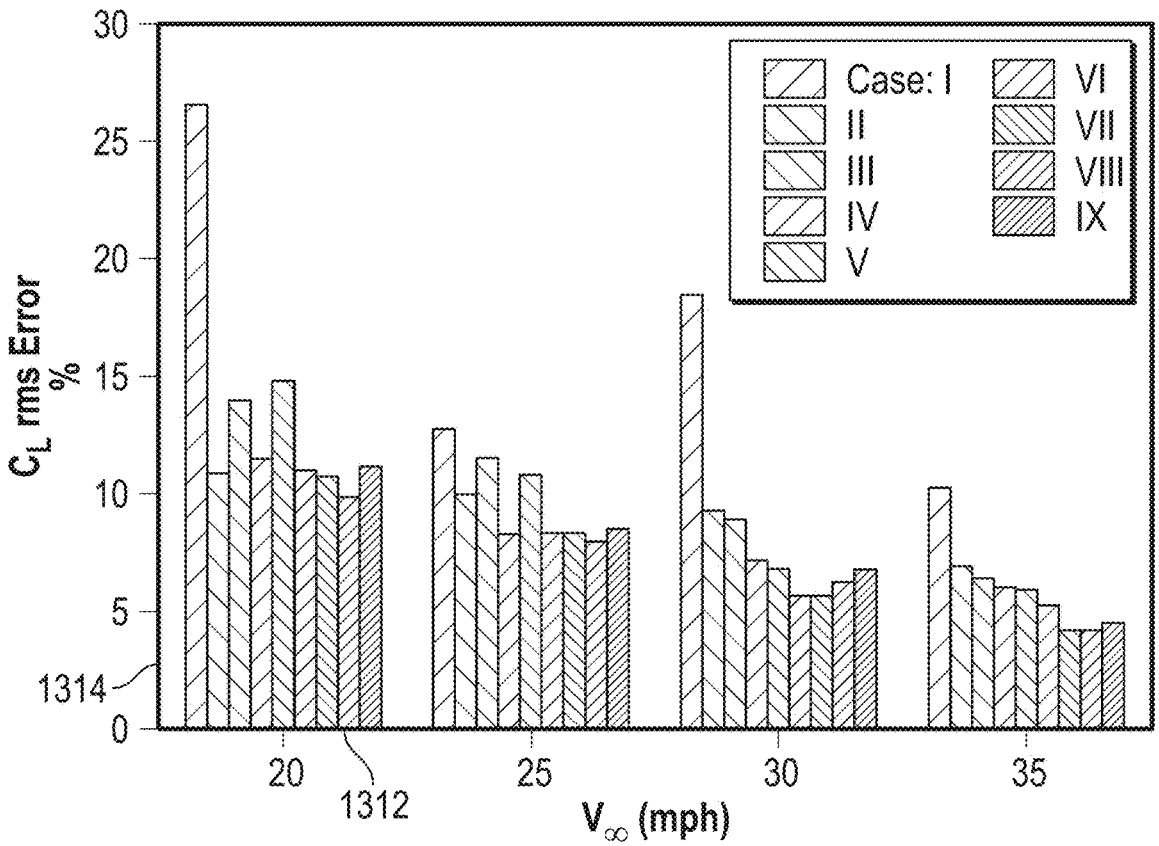

As shown in FIG. 13A, velocity is plotted on the X-axis 1302 and CL is plotted on Y-axis 1304. As shown in FIG. 13B, velocity is plotted on the X-axis 1312 and CM is plotted on Y-axis 1314.

Ten different neural networks with randomly initialized weights and biases were used to predict the lift and moment coefficients and their responses were averaged. Measurement from ten hair sensors on the top surface of the airfoil were used.

Figure 14A:
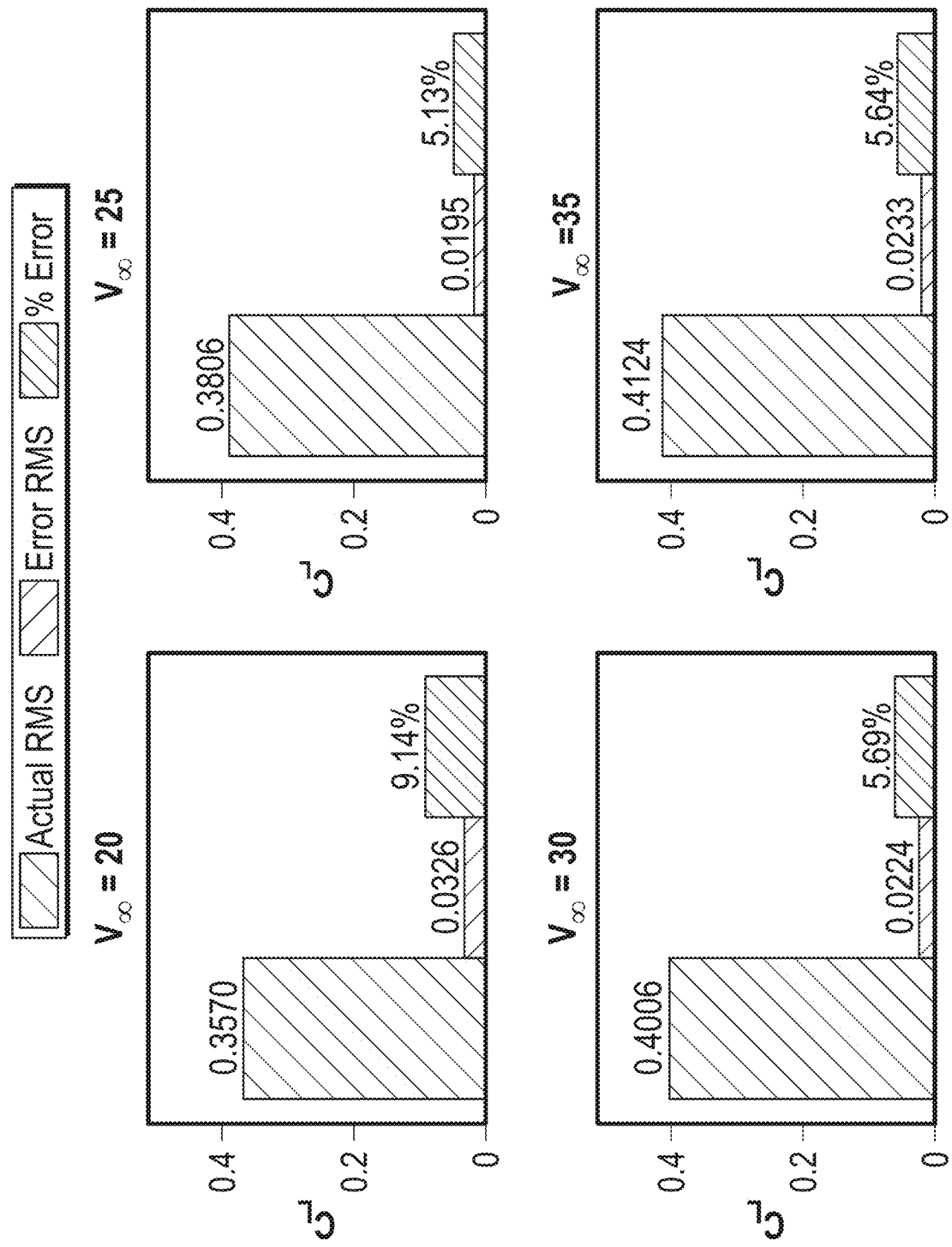
FIGS. 14A and 14B illustrate lift and moment coefficient prediction.
Figure 14B:
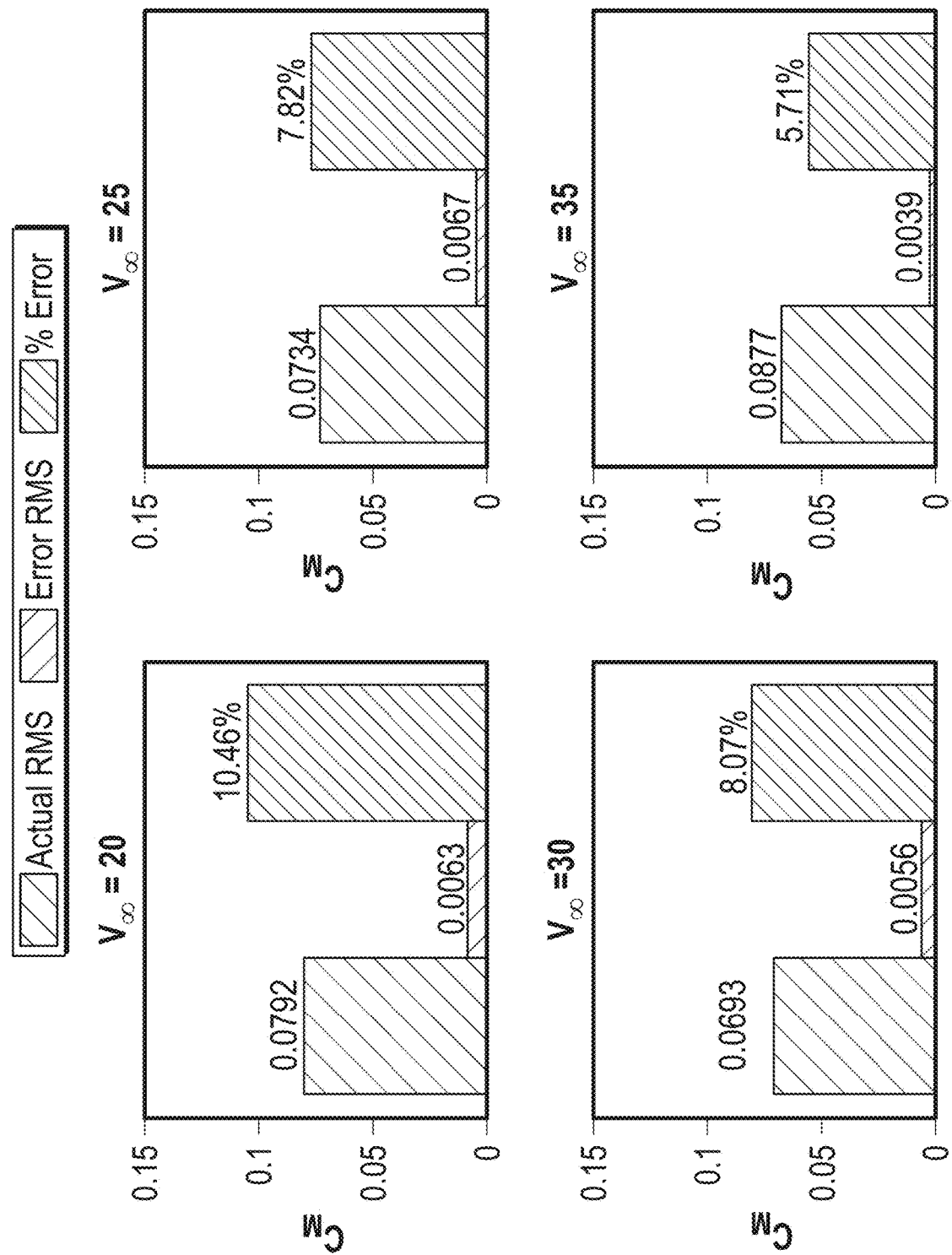

FIGS. 14A and 14B show RMS error on the predictions. The error is comparatively higher for a velocity band of 20 mph. It is due to force measurement error in the wind tunnel at low wind velocity. The error is comparatively low at high wind velocity. Also, the error on moment coefficient prediction is comparatively high since the magnitude of the moment coefficient is very small.

Figure 15A:
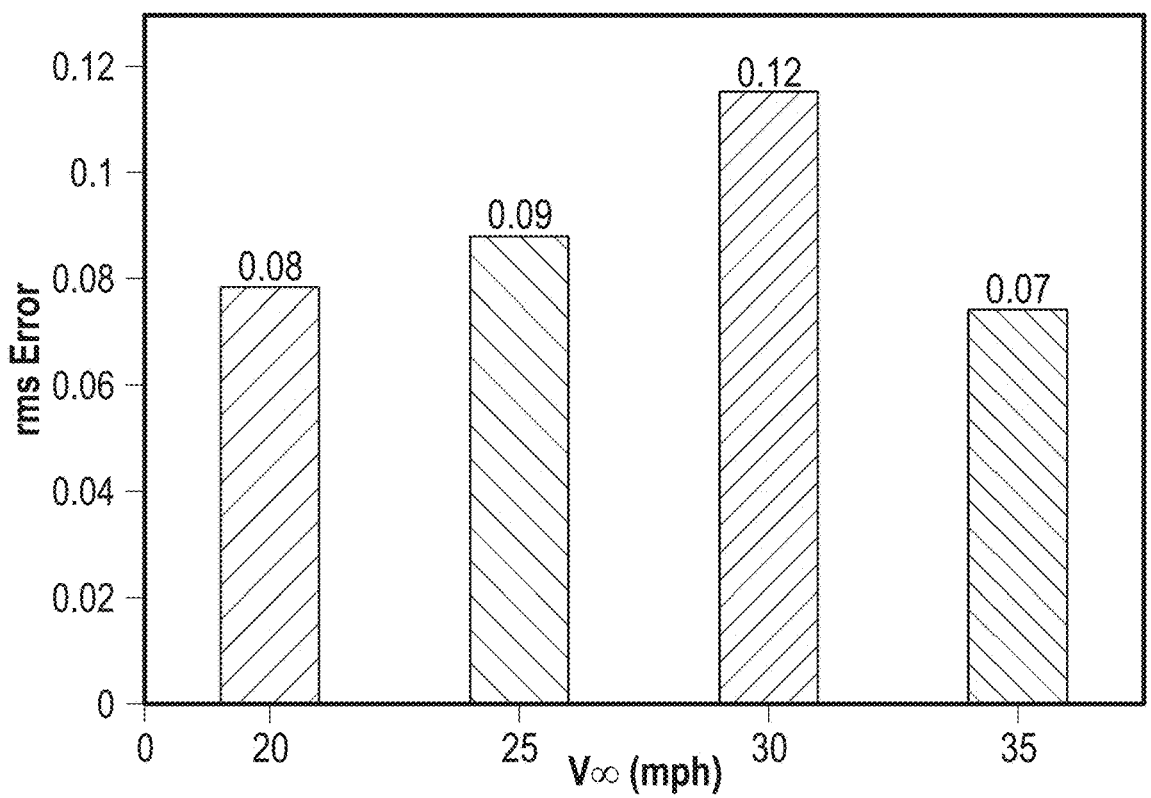
FIGS. 15A and 15B illustrates RMS error in prediction.
Figure 15B:
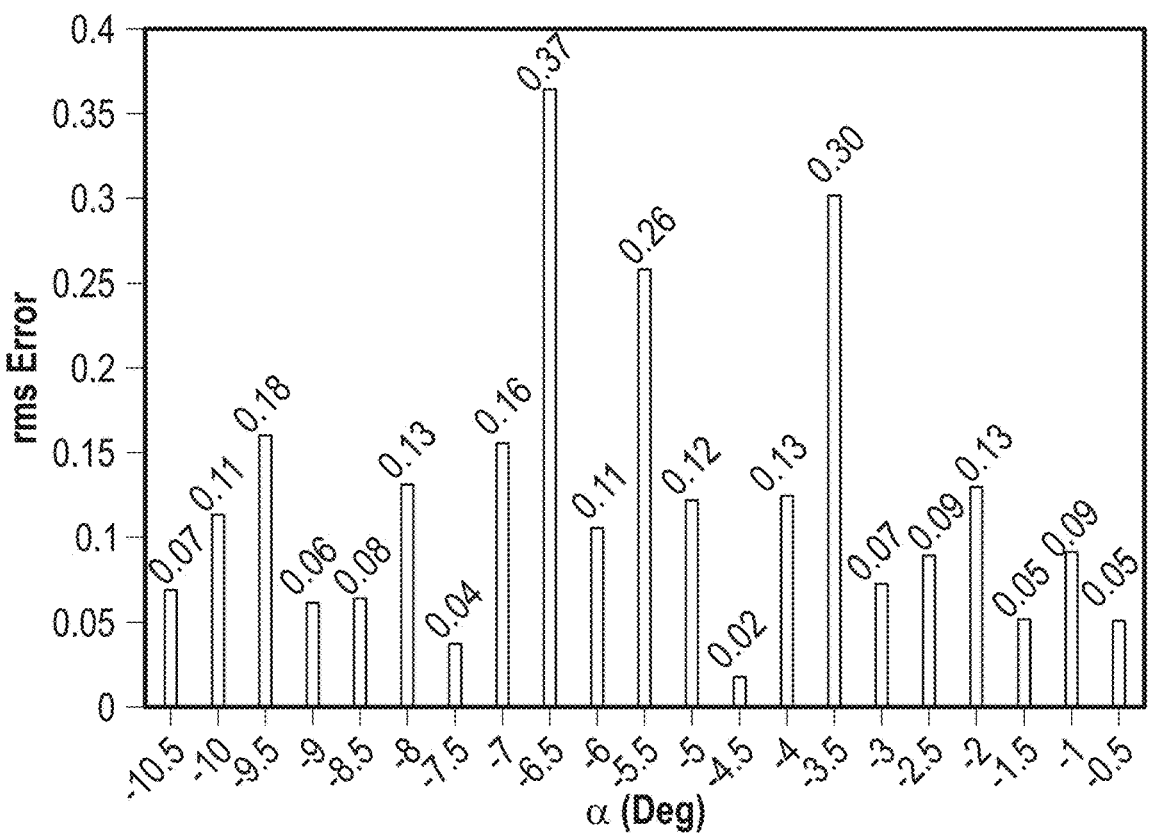

Another ten sets of neural networks with randomly initialized weight and biases are used to predict the free-stream velocity and angle of attack. All the hair sensors were used for this prediction with the training threshold set to approximately 0.0125. The RMS error on each band of free-stream velocity and angle of attack prediction is presented in FIGS. 15A and 15B. Considering approximately 5 mph resolution between each velocity band, the prediction error is negligible with the largest error being approximately 0.12 mph for the approximately 30 mph band. The angles of attack are separated by 0.5° from each band and the prediction error reaches as much as 0.37° for the −5.5° band. Hence the angle of attack prediction error is comparatively higher for some cases. The large prediction error can also be observed from FIG. 10C. This large error can be attributed to the sensitivity of the hair sensor response with change in the angle of attack as observed in the graphs of FIG. 9.

From the prediction, it was observed that the lift coefficient can be predicted within 6% error (except in the 20 mph velocity band where error is within 10%), and moment coefficient can be predicted within 10% error. The error on free-stream velocity prediction was negligible whereas the prediction error was comparatively large for many angle of attack points. While, many factors contribute to the prediction error, some major contribution include:

(i) Number of data points: although a neural network can interpolate the data points, it is ideal to have the data that represents as many points as possible. The rule of thumb is to have unique data points at least equal to the total number of weights and biases. In this exemplary embodiment, the force and moments were measured at 92 unique discrete points. Although the data points were increased by subsampling the resistance measurement, the effective number of data was still limited by the same 92 force measurement points. Considering 437 total weight and biases used, the number of training data used was significantly low. The prediction error can be significantly improved by increasing the number of unique data points.

(ii) Variability in wind tunnel measurement: the proposed feed-forward neural network is meant to approximate the function that relates local flow features to lift and moment coefficient, angle of attack, and free-stream velocity. The data representing the desired functions are dependent on the quality of data gathered from the wind tunnel measurements. At the low wind velocity band, the wind tunnel force measurement has large error especially due to the very low magnitude of lift generated on the wing model compared to the full scale force measurement range of the load balance. Also, the pitching moment was very low and small variation in the measurement will introduce large fraction of error which can be observed in moment coefficient prediction. This issue can be addressed by using the data in the higher wind velocity range, but it will be restricted by the sensor saturation.

(iii) Sensor limitations: the hair sensors in nature such as those on crickets differ in characteristics from one to the next due to the variation in morphology. Likewise the sensitivity and range of these sensors differ from sensor to sensor due to differences in the CNT growth. Favoring robustness and ease of manufacturing, these CNT-based sensors are also limited in range, noisy, and experience long-term drift. These sensors are highly responsive to changes in airflow but only over a limited airflow range.

As can be seen in FIG. 8 and FIG. 9, some of the sensors exhibit low normalized sensitivity over the range of air flows considered which indicates that they are operating outside of their ideal range. Finally, while the shape of the response has been observed to remain steady for many days or weeks, the base resistance and minimum resistance tend to drift on the order of a day. Since all the measurements shown here were taken in a single approximately 8-hour session, this drift should not have significantly contributed to the error. Better understanding of how the underlying CNT properties correlate to a particular sensor's performance and optimum range will allow repeatable production of sensors that are ideally suited for neural net predictions. Also, the response of the sensors is affected by environmental changes such as humidity, temperature, etc. and no protective measures were considered for such environmental change.

Experimental data were used to train and test feed-forward neural networks to predict the aerodynamic parameters of a NACA2410 airfoil in low speed flow. Lift and moment coefficients, angle of attack, and free-stream velocity were predicted by using different sets of neural networks. Only the top sensor array with ten sensors (T1-T10) was used at an angle of attack between −11° and 0° with an increment of 0.5° and free-stream velocity between approximately 20 and approximately 35 mph with an increment of approximately 5 mph.

Prediction of lift coefficient, moment coefficient, and free-stream velocity were close to the actual values whereas there were comparatively large errors for angle of attack prediction. Although an individual sensor has large prediction error for each aerodynamic parameter prediction, using many sensors reduces the error significantly. Also, adding an individual sensor with significant error did not change the prediction error significantly emphasizing the robustness of having distributed and redundant sensors.

Only sensors on the upper surface for the illustrated embodiment were used to predict flow conditions at negative angle of attack. Sensors on the bottom surface can be similarly employed to predict flow conditions at positive angles of attack. The prediction results also show that it is feasible to have bio-like sensing and aerodynamic prediction capabilities using the artificial hair sensors and feed-forward neural networks.

A method as described herein may be used to estimate aerodynamic parameters of a surface. Data, including angle of attack, free stream velocity, lift, moment is recorded. Hair sensor resistances corresponding to the recorded data are determined. This hair sensor resistance data can be normalized and provided to one or more neural networks. The neural network can generate an estimation, or prediction of parameters, such as angle of attack, free stream velocity, lift, moment.

The neural network can be trained with the recorded data using Bayesian regularization back propagation algorithm.

The moment sensitivity of one or more hairs 104 may be expressed as a fraction of the maximum change in response is greater than 0.02 $nN^{-1}\ m^{-1}$. The product of the first natural resonance frequency (f) and the square of the hair length (L) of each artificial hair sensor is greater than 4000 Hz $mm^2$. Furthermore, the moment sensitivity, which may be expressed as a fraction of the maximum change in response is also greater than 0.02 $nN^{-1}\ m^{-1}$.

The root mean square of the response of the artificial hair sensor may be proportional to the magnitude of the turbulent flow and the root mean square of the response of the artificial hair sensor may be proportional to the magnitude and to the characteristic frequencies of the air flow.

Additionally, the root mean square response of the artificial hair sensor may be greater at the resonant frequencies of the sensor.

The response of the sensor at its first resonance frequency may be utilized and/or the response of the sensor at the frequencies corresponding to its second, third, fourth, and/or fifth resonance modes may be utilized.

Utilizing an AHS array or individual hair sensors enables the response of the artificial hair sensor to be used to detect the transition from laminar to turbulent flow.

The root mean square (RMS) response of the artificial hair sensor is above the noise floor for air flows with Reynolds numbers above 1500 and the change in the root mean square of the resistance of the artificial hair sensor due to a change in the Reynolds number of the air flow is also greater than 0.002 ohms.

The root mean square response of the artificial hair sensor is above the noise floor for air flows with Reynolds numbers above 2000 and the change in the root mean square of the resistance of the artificial hair sensor due to a change in the Reynolds number of the air flow is also greater than 0.002 ohms.

While the present disclosure has been illustrated by a description of one or more embodiments thereof and while these embodiments have been described in considerable detail, they are not intended to restrict or in any way limit the scope of the appended claims to such detail. Additional advantages and modifications will readily appear to those skilled in the art, for example observations that the distributed array of hair sensor has an inherent fault tolerant capability. The disclosure in its broader aspects is therefore not limited to the specific details, representative apparatus and method, and illustrative examples shown and described. Accordingly, departures may be made from such details without departing from the scope of the general inventive concept.

It will be appreciated that the systems and methods described above are set forth by way of example and not of limitation. Absent an explicit indication to the contrary, the disclosed steps may be modified, supplemented, omitted, and/or re-ordered without departing from the scope of this disclosure. Numerous variations, additions, omissions, and other modifications will be apparent to one of ordinary skill in the art. In addition, the order or presentation of method steps in the description and drawings above is not intended to require this order of performing the recited steps unless a particular order is expressly required or otherwise clear from the context.

Embodiments disclosed herein may include computer program products comprising computer-executable code or computer-usable code that, when executing on one or more computing devices, performs any and/or all of the steps thereof. The code may be stored in a non-transitory fashion in a computer memory, which may be a memory from which the program executes (such as random-access memory associated with a processor), or a storage device such as a disk drive, flash memory or any other optical, electromagnetic, magnetic, infrared or other device or combination of devices. In another implementation, any of the systems and methods described above may be embodied in any suitable transmission or propagation medium carrying computer-executable code and/or any inputs or outputs from same.

The invention claimed is:

1. A system comprising:
   one or more artificial hair sensors disposed on a surface to acquire flow sensory data in real-time of a plurality of dynamic parameters of the surface, where sensory data is a function of a quantity of the artificial hair sensors;
   a mapping module, operatively coupled to the plurality of artificial hair sensors, the mapping module adapted to receive the flow sensory data acquired by the artificial hair sensors and generate a time-varying signal, where the time-varying signal is a function of a quantity of the dynamic parameters;
   a processor, operatively coupled to the mapping module, the processor adapted to receive the time-varying signal and generate a representation of the time-varying signal; and
   wherein at least one of the artificial hair sensors extends beyond a boundary layer of an airfoil.

2. The system as claimed in claim 1, where the real-time representation of the time-varying signal represents sensed flow phenomena required to determine an angle of attack of an airfoil.

3. The system as claimed in claim 1, where the real-time representation of the time varying signal is a prediction of a response by the surface to aerodynamic characteristics sensed by the plurality of artificial hair sensors.

4. The system as claimed in claim 1, where the one or more artificial hair sensors comprises glass hairs.

5. The system as claimed in claim 1, further comprising a carbon nanotube forest in co-axial orientation.

6. The system as claimed in claim 1, where the mapping module comprises a neural network.

7. The system as claimed in claim 6, where the neural network processes time dependent signals.

8. The system as claimed in claim 1, where a determination of the time-varying signal is a function of a sensed signal power quantity.

9. The system as claimed in claim 1, where the real-time representation of the time-varying signal comprises an estimate over a linear dynamic range.

10. The system as claimed in claim 1, where a hair length of each artificial hair sensor has a proportional ratio relative to a boundary layer of the surface.

11. The system as claimed in claim 1, where each artificial sensor has a hair length and the hair length is related to a mode of sensing by the artificial hair sensor.

12. The system as claimed in claim 1, where the time-varying signal has a frequency greater than approximately 500 hertz.

13. A method comprising:
   acquiring flow sensory data in real-time of a plurality of dynamic parameters of the surface, where sensory data is a function of a quantity of artificial hair sensors;
   generating a time-varying signal, where the time-varying signal is a function of a quantity of the dynamic parameters and the quantity of artificial hair sensors;
   generating a representation of the time-varying signal;

wherein the acquiring includes positioning at least one artificial hair senor beyond a boundary layer and at least one artificial hair sensor within the boundary layer formed on a surface of an airfoil; and estimating an angle of attack of the airfoil using sensory data from the artificial hair sensors.

14. The method as claimed in claim 13, where the real-time representation of the time-varying signal represents sensed flow phenomena.

15. The method as claimed in claim 13, where the real-time representation of the time varying signal is a prediction of a response by the surface to aerodynamic characteristics sensed by the plurality of artificial hair sensors.

16. The method as claimed in claim 13, where generating a time-varying signal comprises processing by one or more neural networks.

17. The method as claimed in claim 16, further comprising processing time dependent signals.

18. The method as claimed in claim 13, where a hair length of each artificial hair sensor has a proportional ratio relative to a boundary layer of the surface.

19. The method as claimed in claim 13, where the time-varying signal has a frequency greater than approximately 500 hertz.

20. An apparatus comprising:

one or more artificial hair sensors disposed on a surface to acquire flow sensory data in real-time of a plurality of dynamic parameters of the surface, where sensory data is a function of a quantity of the artificial hair sensors;

a mapping module, operatively coupled to the plurality of artificial hair sensors, the mapping module adapted to receive the flow sensory data acquired by the artificial hair sensors and generate a time-varying signal, where the time-varying signal is a function of a quantity of the dynamic parameters;

a processor, operatively coupled to the mapping module, the processor adapted to receive the time-varying signal and generate a representation of the time-varying signal;

wherein at least one of the artificial hair sensors extend outside of a boundary layer formed on an airfoil as a fluid flows thereacross; and wherein the processor determines an angle of attack of the airfoil using sensory data acquired by the artificial hair sensors.

* * * * *